United States Patent
Shimohira et al.

(10) Patent No.: US 9,536,676 B2
(45) Date of Patent: Jan. 3, 2017

(54) DYE-SENSITIZED SOLAR CELL MODULE

(71) Applicant: FUJIKURA LTD., Koto-ku, Tokyo (JP)

(72) Inventors: Kouki Shimohira, Chiba (JP); Kenichi Okada, Chiba (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 14/015,143

(22) Filed: Aug. 30, 2013

(65) Prior Publication Data
US 2014/0000678 A1    Jan. 2, 2014

Related U.S. Application Data

(63) Continuation of application No. PCT/JP2012/054815, filed on Feb. 27, 2012.

(30) Foreign Application Priority Data

Mar. 2, 2011 (JP) ................................ 2011-044678

(51) Int. Cl.
*H01G 9/20* (2006.01)

(52) U.S. Cl.
CPC .......... *H01G 9/2077* (2013.01); *H01G 9/2081* (2013.01); *H01G 9/2031* (2013.01); *H01G 9/2059* (2013.01); *Y02E 10/542* (2013.01)

(58) Field of Classification Search
None
See application file for complete search history.

(56) References Cited

U.S. PATENT DOCUMENTS

| | | | |
|---|---|---|---|
| 2006/0112988 A1* | 6/2006 | Morooka | 136/256 |
| 2010/0065101 A1* | 3/2010 | Zaban et al. | 136/244 |
| 2011/0220202 A1* | 9/2011 | Yang | 136/259 |

(Continued)

FOREIGN PATENT DOCUMENTS

| | | |
|---|---|---|
| EP | 1548868 A1 | 6/2005 |
| EP | 2 276 102 A1 | 1/2011 |

(Continued)

OTHER PUBLICATIONS

Japanese Office Action issued Feb. 12, 2014 in Japanese Patent Application No. 2013-502340.

(Continued)

*Primary Examiner* — Susan D Leong
(74) *Attorney, Agent, or Firm* — Sughrue Mion, PLLC

(57) ABSTRACT

A dye-sensitized solar cell module includes a plurality of dye-sensitized solar cells electrically connected in series. The dye-sensitized solar cell includes a first electrode that comprises a transparent substrate, and a transparent conductive film provided on the transparent substrate, a second electrode that faces the first electrode, an oxide semiconductor layer that is provided on the first electrode or the second electrode, and an annular sealing section that joins the first electrode and the second electrode. The transparent substrate is composed of a transparent substrate that is common to the plurality of dye-sensitized solar cells. The second electrodes of two adjoining dye-sensitized solar cells are separated apart from each other. The sealing section includes an annular first sealing section that is provided between the first electrode and the second electrode, and the first sealing sections that are adjoining are integrated together.

8 Claims, 12 Drawing Sheets

(56) References Cited

U.S. PATENT DOCUMENTS

2011/0223704 A1    9/2011   Doi et al.

FOREIGN PATENT DOCUMENTS

| JP | 2005-078857 | 3/2005 |
|---|---|---|
| JP | 2005-216663 | 8/2005 |
| JP | 2006-294423 | 10/2006 |
| JP | 2007-220606 A | 8/2007 |
| JP | 2008226554 A | 9/2008 |
| JP | 2010-040432 A | 2/2010 |
| JP | 201140361 A | 2/2011 |
| WO | 2009/133689 A1 | 11/2009 |
| WO | 2011/013423 | 2/2011 |
| WO | WO2011013423 A1 * | 2/2011 |

OTHER PUBLICATIONS

Supplementary European Search Report issued Aug. 1, 2014 in European Patent Application No. 12751921.3.
Chinese Office Action issued Nov. 27, 2014 in Chinese Patent Application No. 201280004104.9.
Chinese Office Action issued Aug. 27, 2015 in Chinese Patent Application No. 20128004104.9.

* cited by examiner ies. This application is a Continuation of National Stage of International Application No. PCT/JP2012/54815 filed Feb. 27, 2012, claiming priority based on Japanese Patent Application No. 2011-044678 filed Mar. 2, 2011, the contents of all of which are incorporated herein by reference in their entirety.

TECHNICAL FIELD

The present invention relates to a dye-sensitized solar cell module.

BACKGROUND ART

As a photoelectric conversion element module which is inexpensive and can give high photoelectric conversion efficiency, attention has been paid to dye-sensitized solar cell modules, and thus, development has been carried out in various ways in connection with dye-sensitized solar cell modules.

A dye-sensitized solar cell module generally includes plural dye-sensitized solar cells that are connected in series, and each dye-sensitized solar cell includes a working electrode, a counter electrode, and an annular sealing section that connects the working electrode and the counter electrode. The working electrode has a transparent substrate, a transparent conductive film formed thereon, and an oxide semiconductor layer provided on the transparent conductive film. As such a dye-sensitized solar cell module, for example, a solar cell module such as described in Patent Document 1 that will be described below is known. Patent Document 1 described below discloses a dye-sensitized solar cell module having two adjoining dye-sensitized solar cells, in which a conductive member extending from the counter electrode of one of the dye-sensitized solar cells, and a transparent conductive film of the other dye-sensitized solar cell are connected at a site between adjoining sealing sections.

CITATION LIST

Patent Document

Patent Document 1: WO 2009/133689

SUMMARY OF INVENTION

Problem to be Solved by the Invention

By the way, dye-sensitized solar cell modules are occasionally accommodated in casings with an opening. In this case, a dye-sensitized solar cell module is disposed such that all the light-receiving surfaces of dye-sensitized solar cells are accommodated inside an outer frame member provided along the periphery of the opening. Accordingly, as the total area of the light-receiving surfaces occupying the inner area of the outer frame member is larger, the aperture ratio increases.

Thus, having a high aperture ratio is required in dye-sensitized solar cell modules that are used outdoors, as well as in small-sized dye-sensitized solar cell modules in which the electric current generated by one dye-sensitized solar cell is less than 500 mA, or even in dye-sensitized solar cell modules that are utilized in places where the intensity of illumination is relatively low, such as indoors. Particularly, small-sized dye-sensitized solar cell modules, and dye-sensitized solar cell modules that are utilized in places where the intensity of illumination is relatively low have small areas of light reception and small amounts of light reception, as compared with those dye-sensitized solar cell modules that are used outdoors. Therefore, there is a demand for dye-sensitized solar cell modules to have particularly high aperture ratios so that power generation can be efficiently achieved.

However, in the dye-sensitized solar cell module described in Patent Document 1, in the two adjoining dye-sensitized solar cells, a conductive member extending from the counter electrode of one dye-sensitized solar cell and a transparent conductive film of the other dye-sensitized solar cell are connected at a site between adjoining sealing sections. That is, the connection point where the edge of the counter electrode and the transparent conductive film are connected, exists within a light-receiving area such as the inner region of the outer frame member. Therefore, the solar cell module cannot contribute to power generation as much as the portion of the area of the connection point, and the aperture ratio is decreased. Particularly, the area required for the connection point is usually almost invariable in dye-sensitized solar cell modules having large areas of light reception as well as in dye-sensitized solar cell modules having small areas of light reception. Therefore, if a connection point between two adjoining dye-sensitized solar cells is located within the light-receiving area, as the area of light reception of the dye-sensitized solar cell module is smaller, the aperture ratio decreases. Here, in order to obtain a high aperture ratio, it is contemplated to decrease the area of the connection point. However, in this case, the bonding strength at the connection point decreases, and thus the connection reliability is decreased. Therefore, it has been difficult to obtain a higher aperture ratio in the dye-sensitized solar cell module described in Patent Document 1.

Thus, the dye-sensitized solar cell module described in Patent Document 1 has room for an improvement in view of an enhancement in the aperture ratio.

Furthermore, in the dye-sensitized solar cell module described in Patent Document 1, adjoining dye-sensitized solar cells are connected at a site between adjoining sealing sections. Therefore, there is a gap between two adjoining sealing sections, and the two adjoining sealing sections are respectively exposed at the gap. Therefore, moisture or air in the atmosphere can easily penetrate into the interior of the dye-sensitized solar cells. Accordingly, the dye-sensitized solar cell module described in Patent Document 1 has room for an improvement in view of durability, too.

In addition, it is also contemplated to decrease the sealing width of the sealing section of each of the dye-sensitized solar cells in order to increase the aperture ratio. However, in this case, although the aperture ratio is increased, the sealing performance is deteriorated, and durability is deteriorated.

Alternatively, in the case of using a metal substrate for the counter electrode of a dye-sensitized solar cell, in order to increase the aperture ratio, it is contemplated to electrically connect adjoining dye-sensitized solar cells outside the light-receiving area, by connecting an end of a jumper wire to the surface of the counter electrode on the opposite side of the working electrode, providing a protruding section that protrudes from the transparent conductive film of an adjoining dye-sensitized solar cell laterally to the sealing section on the outside of the sealing section, and connecting the other end of the jumper wire to this protruding section.

However, in this case, the jumper wire tends to become long in order to connect the counter electrode of one dye-sensitized solar cell with the protruding section at the transparent conductive film of another dye-sensitized solar cell. Therefore, for example, upon handling a dye-sensitized solar cell module, if an operator's hand is caught by the jumper wire, it is likely that excessive stress will be exerted on the connection point between the jumper wire and the counter electrode, or to the connection point between the jumper wire and the protruding section of the transparent conductive film. As a result, there is a risk that the connection reliability may be impaired.

Here, it is also contemplated to use a metal film instead of a jumper wire. In the case of using a metal film, the risk of the operator's hand being caught by the jumper wire is low. However, when the counter electrode of one dye-sensitized solar cell and a protruding section in the transparent conductive film of another dye-sensitized solar cell are connected by using a metal film, there is a risk that the metal film may be brought into contact with the counter electrode of the other dye-sensitized solar cell. As a result, defective operation occurs in the dye-sensitized solar cell module.

The present invention was achieved in view of the circumstances described above, and it is a first object of the present invention to provide a dye-sensitized solar cell module which can increase the aperture ratio and has excellent durability.

It is a second object of the present invention to provide a dye-sensitized solar cell module which can sufficiently increase the connection reliability while increasing the aperture ratio, and can sufficiently prevent defective operation.

Means for Solving Problem

The inventors of the present invention conducted thorough investigations in order to achieve the first object, and as a result, the inventors found that the first object can be achieved by the following invention. Thus, the inventors finally completed the present invention.

That is, the present invention is a dye-sensitized solar cell module including plural dye-sensitized solar cells that are electrically connected in series, the dye-sensitized solar cell including a first electrode having a transparent substrate and a transparent conductive film provided on the transparent substrate; a second electrode that faces the first electrode; an oxide semiconductor layer provided on the first electrode or the second electrode; and an annular sealing section that joins the first electrode and the second electrode, in which the transparent substrate is constituted of a transparent substrate that is common to the plural dye-sensitized solar cells, the second electrodes of two adjoining dye-sensitized solar cells are separated apart from each other, and the sealing section has an annular first sealing section that is provided between the first electrode and the second electrode, with adjoining first sealing sections being integrated together.

According to this dye-sensitized solar cell module, the first sealing sections are integrated together. Here, if adjoining first sealing sections are not integrated together, there will be two sites of the sealing section that are exposed to the atmosphere in the area between adjoining dye-sensitized solar cells. On the contrary, in the dye-sensitized solar cell module of the present invention, since adjoining first sealing sections are integrated together, there will be one site of the sealing section that is exposed to the atmosphere in the area between the adjoining dye-sensitized solar cells. Furthermore, as the first sealing sections are integrated together, the distance of penetration of moisture and the like from the atmosphere to the electrolyte increases. Therefore, the amount of moisture or air that penetrates from the outside of the dye-sensitized solar cell can be sufficiently reduced in the area between adjoining dye-sensitized solar cells. That is, the sealing ability of the dye-sensitized solar cell module can be sufficiently enhanced. Furthermore, according to the dye-sensitized solar cell module of the present invention, adjoining first sealing sections are integrated. For this reason, even if first sealing sections are integrated while the sealing width at the first sealing sections is made smaller than the sealing width of the first sealing sections that are not integrated together, a sufficient sealing width can be secured. That is, the adhesive strength between the first sealing section and the first electrode, and the adhesive strength between the first sealing section and the second electrode can be sufficiently increased while the aperture ratio is increased. As a result, the aperture ratio can be increased, and at the same time, when the dye-sensitized solar cell module is used at a high temperature, even if the electrolyte expands and excessive stress is exerted in the direction from the inner side of the first sealing section toward the outside, detachment of the first sealing section from the first electrode and the second electrode can be sufficiently suppressed. Thus, the dye-sensitized solar cell module can have excellent durability.

In the dye-sensitized solar cell module described above, it is preferable that the first sealing section be extended through the gap between the adjoining second electrodes, to the opposite side of the first electrode in the second electrode, and be adhered to an edge of the second electrode.

In this case, the first sealing section is extended to the surface of the opposite side of the first electrode in the second electrode and is adhered to an edge of the second electrode. Therefore, even if stress is exerted on the second electrode in a direction of being separated away from the first electrode, detachment of the second electrode is sufficiently suppressed by the first sealing section.

Furthermore, since the first sealing section is extended to the surface on the opposite side of the first electrode in the second electrode and is adhered to an edge of the second electrode, the distance of penetration of moisture and the like from the atmosphere to the electrolyte is further increased. Therefore, the amount of moisture or air penetrating from the outside of the dye-sensitized solar cell in the region between adjoining dye-sensitized solar cells can be more sufficiently reduced.

In the dye-sensitized solar cell module, the sealing section further includes an annular second sealing section that is provided so as to overlap with the first sealing section, and sandwiches an edge of the second electrode together with the first sealing section, and the second sealing sections of two adjoining dye-sensitized solar cells may be integrated together, while the second sealing section may be adhered to the first sealing section through the gap between the second electrodes of the two adjoining dye-sensitized solar cells.

In this case, the second sealing section is adhered to the first sealing section through the gap between adjoining second electrodes, and an edge of the second electrode is sandwiched between the first sealing section and the second sealing section. Therefore, even if stress is exerted on the second electrode in a direction of being separated away from the first electrode, detachment of the second electrode is sufficiently suppressed by the second sealing section.

The second sealing section preferably has a melting point higher than that of the first sealing section.

In this case, since the second sealing section becomes harder than the first sealing section, the contact between the second electrodes of adjoining dye-sensitized solar cells can be effectively prevented. Furthermore, since the first sealing section becomes softer than the second sealing section, the stress applied to the sealing section can be effectively relieved.

In the dye-sensitized solar cell module described above, the sealing section contains, for example, a resin.

In the dye-sensitized solar cell module described above, it is preferable that the dye-sensitized solar cell further include an insulating material that is provided between the first sealing section and the transparent substrate, and the thickness of the insulating material be larger than the thickness of the transparent conductive film, while the melting point of the insulating material be higher than the melting point of the first sealing section.

In this case, the insulating material has a melting point higher than that of the first sealing section. Therefore, there are occasions in which, for example, the dye-sensitized solar cell module is used at a high temperature, the first sealing section is softened, and the space between the first electrode and the second electrode is narrowed. At this time, even if the second electrode tends to come closer to the transparent conductive film, since the thickness of the insulating material is larger than the thickness of the transparent conductive film, and the insulating material has a melting point higher than that of the first sealing section, the contact between the second electrode and the transparent conductive film is sufficiently prevented.

In the dye-sensitized solar cell module described above, it is preferable that in two adjoining dye-sensitized solar cells, the transparent conductive film in one of the dye-sensitized solar cells includes a main body section; a protruding section that protrudes from the main body section over the sealing section laterally in the direction of arrangement of the plural dye-sensitized solar cell; and an extending section that extends from the protruding section to a position lateral to the main body section of the other dye-sensitized solar cell on the outside of the sealing section of the other dye-sensitized solar cell, and the second electrode have a metal substrate, while the extending section of the transparent conductive film in the one dye-sensitized solar cell and the metal substrate of the second electrode in the other dye-sensitized solar cell be connected through a conductive material.

In this case, the transparent conductive film in the dye-sensitized solar cell includes a protruding section that protrudes from the main body section over the sealing section laterally in the direction of arrangement of plural dye-sensitized solar cells; and an extending section that extends from the protruding section to a position lateral to the main body section of the other dye-sensitized solar cell on the outside of the sealing section of the other dye-sensitized solar cell, and the extending section in the transparent conductive film of one dye-sensitized solar cell and the metal substrate of the second electrode in the other dye-sensitized solar cell are connected through a conductive material. That is, in the dye-sensitized solar cell module of the present invention, in two adjoining dye-sensitized solar cells, the transparent conductive film of one of the dye-sensitized solar cells is connected to the second electrode of the other dye-sensitized solar cell on the outside of the light-receiving area that includes the sealing section of all the dye-sensitized solar cells. In other words, the connection point that does not contribute to power generation in the dye-sensitized solar cell module is provided on the outside of the light-receiving area. Therefore, the aperture ratio can be further increased. Also, since the transparent conductive film of one of the dye-sensitized solar cells and the second electrode of the other dye-sensitized solar cell are connected on the outside of the sealing section, the area of the connection point between the transparent conductive film and the conductive material and the connection point between the second electrode and the conductive material can also be enlarged. Furthermore, the extending section of the transparent conductive film in one of the dye-sensitized solar cells is extended from the protruding section to a position lateral to the main body section of the other dye-sensitized solar cell on the outside of the sealing section of the other dye-sensitized solar cell. That is, the transparent conductive film of a dye-sensitized solar cell is provided immediately close to the second electrode of an adjoining dye-sensitized solar cell. Accordingly, the conductive material can be shortened, and the operator's hand is not easily caught by the conductive material. As a result, exertion of excessive stress on the connection point between the conductive material and the second electrode and the connection point between the conductive material and the transparent conductive film can be prevented, and the connection reliability in the dye-sensitized solar cell module can be sufficiently enhanced. Furthermore, since the contact between the conductive material and the second electrode of an adjoining dye-sensitized solar cell is sufficiently prevented, adjoining second electrodes being electrically connected through the conductive material is sufficiently prevented. As a result, defective operation of the dye-sensitized solar cell module can also be sufficiently prevented.

In the dye-sensitized solar cell module described above, it is preferable that the portion that is provided between two adjoining dye-sensitized solar cells in the first sealing section be formed from a low heat conductive material having a lower heat conductivity than the portion that is not provided between two adjoining dye-sensitized solar cells in the first sealing section.

According to the dye-sensitized solar cell module described above, the portion that is provided between two adjoining dye-sensitized solar cells in the first sealing section is formed from a low heat conductive material having a lower heat conductivity than the portion that is not provided between two adjoining dye-sensitized solar cells. Therefore, even if a certain dye-sensitized solar cell is locally heated to a high temperature by the heat of sunlight or the like, and the portion that is provided between two adjoining dye-sensitized solar cells in the first sealing section is locally heated to a high temperature, since the portion that has been heated to a high temperature has lower heat conductivity than the portion that is not provided between two adjoining dye-sensitized solar cells, it is difficult for the heat to be transferred to adjoining dye-sensitized solar cells, and deterioration of the adjoining dye-sensitized solar cells can be sufficiently suppressed.

In the dye-sensitized solar cell module described above, it is preferable that the first electrode further include a wiring section that is provided between the first sealing section and the transparent substrate, and the wiring section include a current collector wire that is provided on the transparent conductive film of two adjoining dye-sensitized solar cells; a wiring protective layer that protects the current collector wire from the electrolyte by covering the current collector wire and is joined to the first sealing section, and the area provided between two adjoining dye-sensitized solar cells in the first sealing section or the wiring protective layer be formed from a low heat conductive material having lower heat conductivity than the area that is not provided between two adjoining dye-sensitized solar cells.

According to the dye-sensitized solar cell module described above, the area that is provided between two adjoining dye-sensitized solar cells in the first sealing section or the wiring protective layer is formed from a low heat conductive material having lower heat conductivity than the area that is not provided between two adjoining dye-sensitized solar cells. For this reason, even if a certain dye-sensitized solar cell is locally heated to a high temperature by the heat of sunlight or the like, and the portion that is provided between two adjoining dye-sensitized solar cells in the first sealing section or the wiring protective layer is locally heated to a high temperature, since the portion that has been heated to a high temperature has lower heat conductivity than the portion that is not provided between two adjoining dye-sensitized solar cells, it is difficult for the heat to be transferred to adjoining dye-sensitized solar cells, and deterioration of the adjoining dye-sensitized solar cells can be sufficiently suppressed.

In the dye-sensitized solar cell module described above, it is preferable that the dye-sensitized solar cell include a low heat conductive layer formed of a low heat conductive material having a lower heat conductivity than the first sealing section, between the first sealing section and the first electrode or the second electrode.

According to the dye-sensitized solar cell module described above, a low heat conductive layer formed from a low heat conductive material having lower heat conductivity than the first sealing section is provided between the first sealing section and the first electrode or the second electrode. Therefore, even if a certain dye-sensitized solar cell is locally heated to a high temperature by the heat of sunlight or the like, and the low heat conductive layer is locally heated to a high temperature, since the low heat conductive layer has lower heat conductivity than the first sealing section, fluidity of the low heat conductive layer does not easily decrease. Therefore, the relative positional relationship between the counter electrodes of adjoining dye-sensitized solar cells can be sufficiently retained.

In the dye-sensitized solar cell module described above, it is preferable that the first electrode further include a wiring section that is provided between the first sealing section and the transparent substrate; the wiring section include a current collector wire that is provided on the transparent conductive film of two adjoining dye-sensitized solar cells, and a wiring protective layer that protects the current collector wire from the electrolyte by covering the current collector wire and is joined to the first sealing section; and the dye-sensitized solar cell include a low heat conductive layer formed from a low heat conductive material having a lower heat conductivity than the first sealing section and the wiring protective layer between the first sealing section and the wiring protective layer or the second electrode.

According to the dye-sensitized solar cell module described above, a low heat conductive layer formed from a low heat conductive material having lower heat conductivity than the first sealing section and the wiring protective layer is provided between the first sealing section and the wiring protective layer or the second electrode. For this reason, even if a certain dye-sensitized solar cell is locally heated to a high temperature by the heat of sunlight or the like, and low heat conductive layer is locally heated to a high temperature, since the low heat conductive layer has lower heat conductivity than the first sealing section and the wiring protective layer, fluidity of the low heat conductive layer does not easily decrease. Therefore, the relative positional relationship between the counter electrodes of adjoining dye-sensitized solar cells can be sufficiently retained.

The low conductive material preferably contains a resin. In this case, since stress is sufficiently relieved at the low heat conductive layer, the stress that is exerted on the interface between the first sealing section and the first electrode or the second electrode can be sufficiently relieved.

In addition, the invention that achieves the second object is constituted as follows.

That is, the invention that can achieve the second object described above is a dye-sensitized solar cell module including plural dye-sensitized solar cells that are connected in series, the dye-sensitized solar cell including a first electrode having a transparent substrate, and a transparent conductive film that is provided on the transparent substrate and has a main body section; a second electrode that faces the first electrode and includes a metal substrate; an oxide semiconductor layer that is provided on the first electrode or the second electrode; and an annular sealing section that bonds the first electrode and the second electrode, in which the transparent substrate is composed of a transparent substrate that is common to the plural dye-sensitized solar cells; in two adjoining dye-sensitized solar cells, the transparent conductive film in one of the dye-sensitized solar cells includes a protruding section that protrudes from the main body section over the sealing section laterally in the direction of arrangement of the plural dye-sensitized solar cell; and an extending section that extends from the protruding section to a position lateral to the main body section of the other dye-sensitized solar cell on the outside of the sealing section of the other dye-sensitized solar cell, and the extending section of the transparent conductive film in the one dye-sensitized solar cell and the metal substrate of the second electrode in the other dye-sensitized solar cell be connected through a conductive material.

According to this dye-sensitized solar cell module, the transparent conductive film in one dye-sensitized solar cell includes a protruding section that protrudes from the main body section over the sealing section laterally in the direction of arrangement of plural dye-sensitized solar cells; and an extending section that extends from the protruding section to a position lateral to the main body section of another dye-sensitized solar cell on the outside of the sealing section of the other dye-sensitized solar cell, and the extending section and the metal substrate of the second electrode in the other dye-sensitized solar cell are connected through a conductive material. That is, in the dye-sensitized solar cell module of the present invention, in two adjoining dye-sensitized solar cells, the transparent conductive film of one dye-sensitized solar cell and the second electrode of another dye-sensitized solar cell are connected on the outside of the light-receiving area that includes the sealing section of all the dye-sensitized solar cells. In other words, the connection point that does not contribute to power generation in the dye-sensitized solar cell module is provided on the outside of the light-receiving area. Therefore, the aperture ratio can be further increased. Furthermore, since the transparent conductive film of one dye-sensitized solar cell and the second electrode of the other dye-sensitized solar cell are connected on the outside of the sealing section, the areas of the connection point between the transparent conductive film and the conductive material and the connection point of the second electrode and the conductive material can also be enlarged. Furthermore, the extending section of the transparent conductive film in one dye-sensitized solar cell is extended from the protruding section to a position lateral to the main body section of the other dye-sensitized solar cell on the outside of the sealing section of the other dye-sensitized solar cell. That is, the transparent conductive film of a dye-sensitized solar cell is provided immediately close to the second electrode of an adjoining dye-sensitized solar cell. For this reason, the conductive material can be shortened, and the operator's hand is not easily caught by the conductive material. As a result, exertion of excessive stress on the connection point between the conductive material and the second electrode or the connection point between the conductive material and the transparent conductive film can be prevented, and the connection reliability in the dye-sensitized solar cell module can be sufficiently enhanced. Furthermore, since the conductive material is sufficiently prevented from being brought into contact with the second electrode of an adjoining dye-sensitized solar cell, adjoining second electrodes are sufficiently prevented from being electrically connected through the conductive material. As a result, defective operation of the dye-sensitized solar cell module can also be sufficiently prevented.

The conductive material is preferably a metal film.

In this case, the surface asperity on the back surface side of the second electrode can be decreased. As a result, the dye-sensitized solar cell module can be stably installed on a flat surface.

Effect of the Invention

According to the present invention, there is provided a dye-sensitized solar cell module having excellent durability, in which the aperture ratio can be increased.

MODE(S) FOR CARRYING OUT THE INVENTION

Hereinafter, embodiments of the present invention will be described in detail.

First Embodiment

Figure 1:
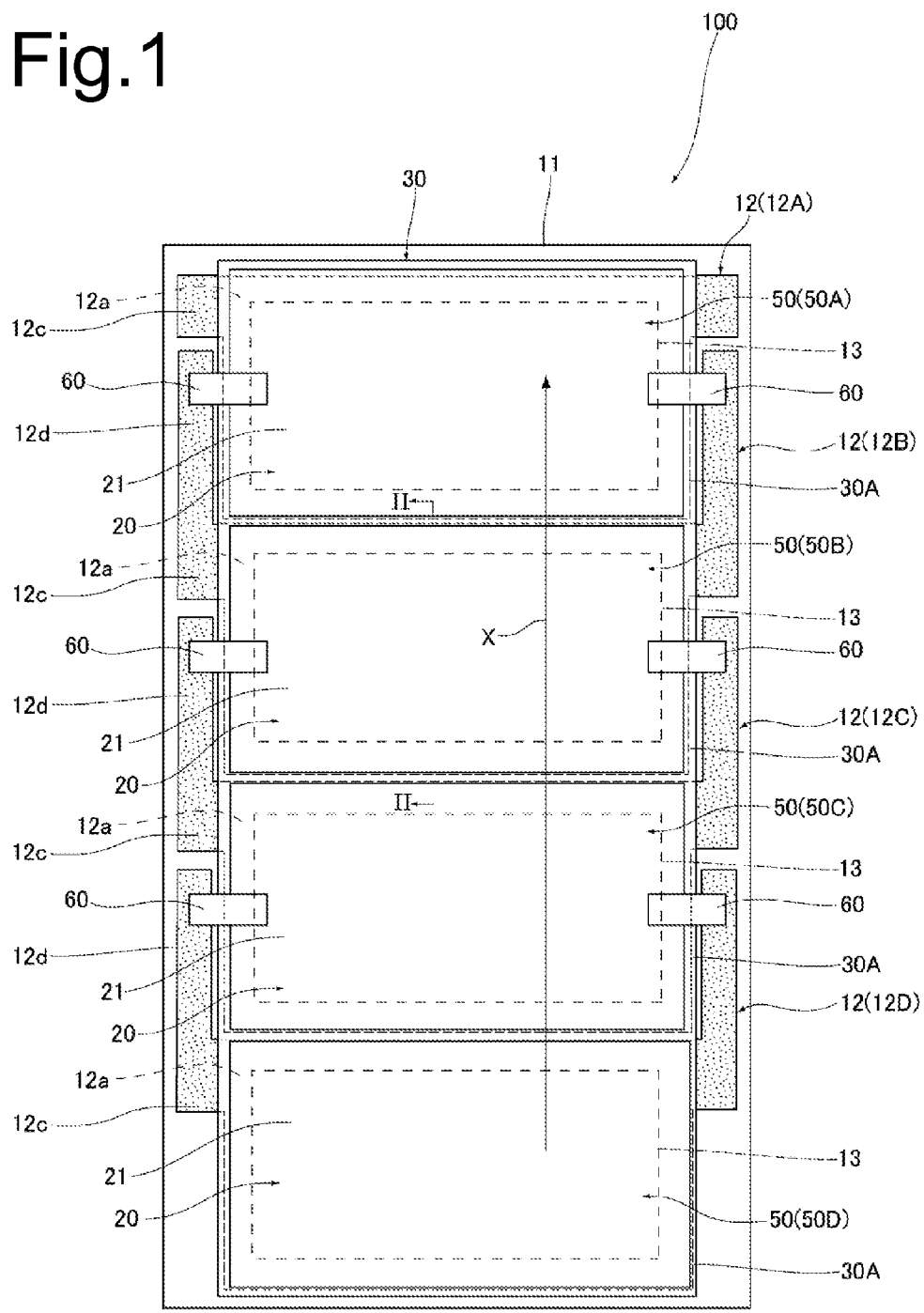
FIG. 1 is a bottom view illustrating a first embodiment of the dye-sensitized solar cell module of the present invention.
Figure 2:
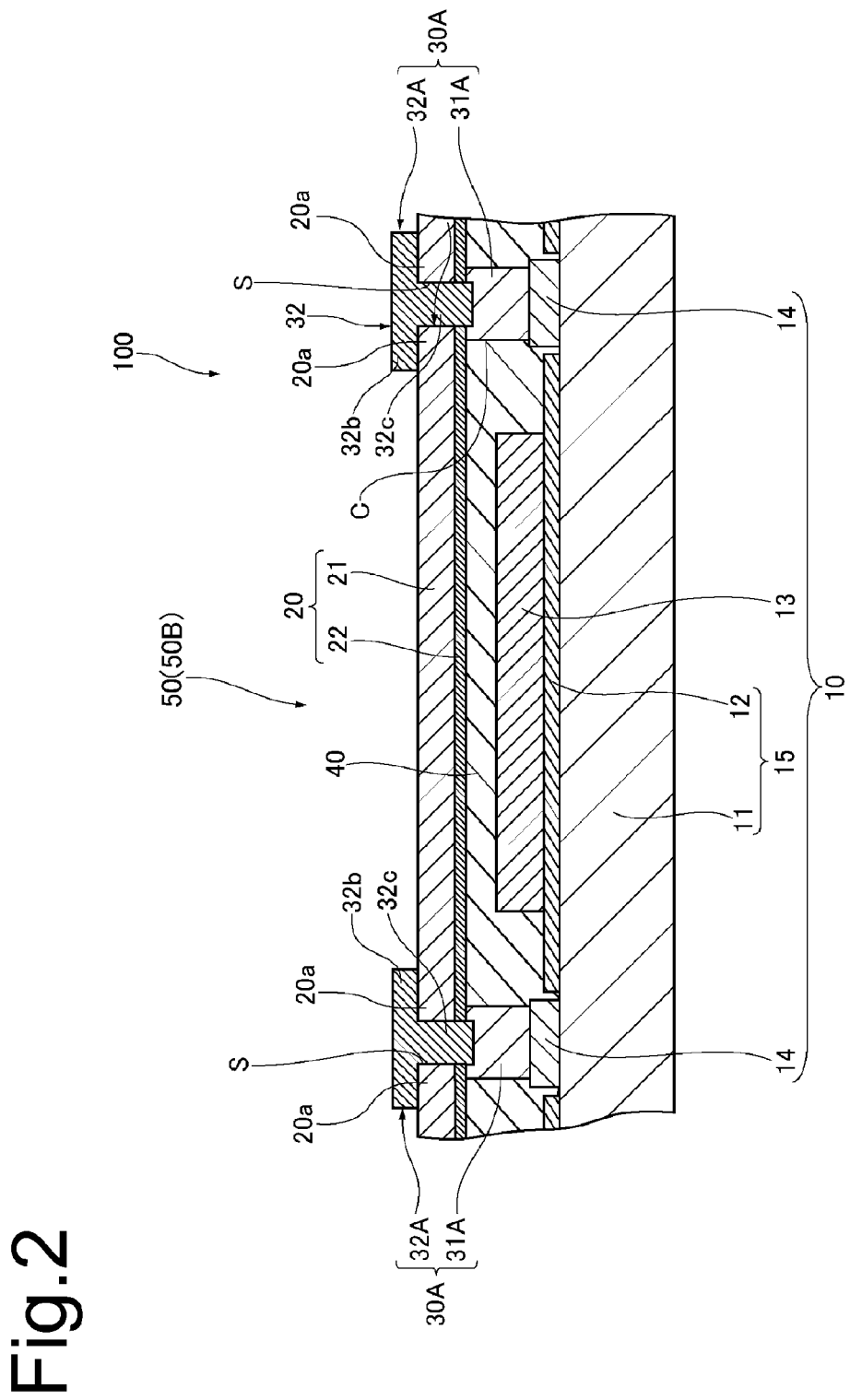
FIG. 2 is a cross-sectional view of FIG. 1 cut along the II-II line.
Figure 3:
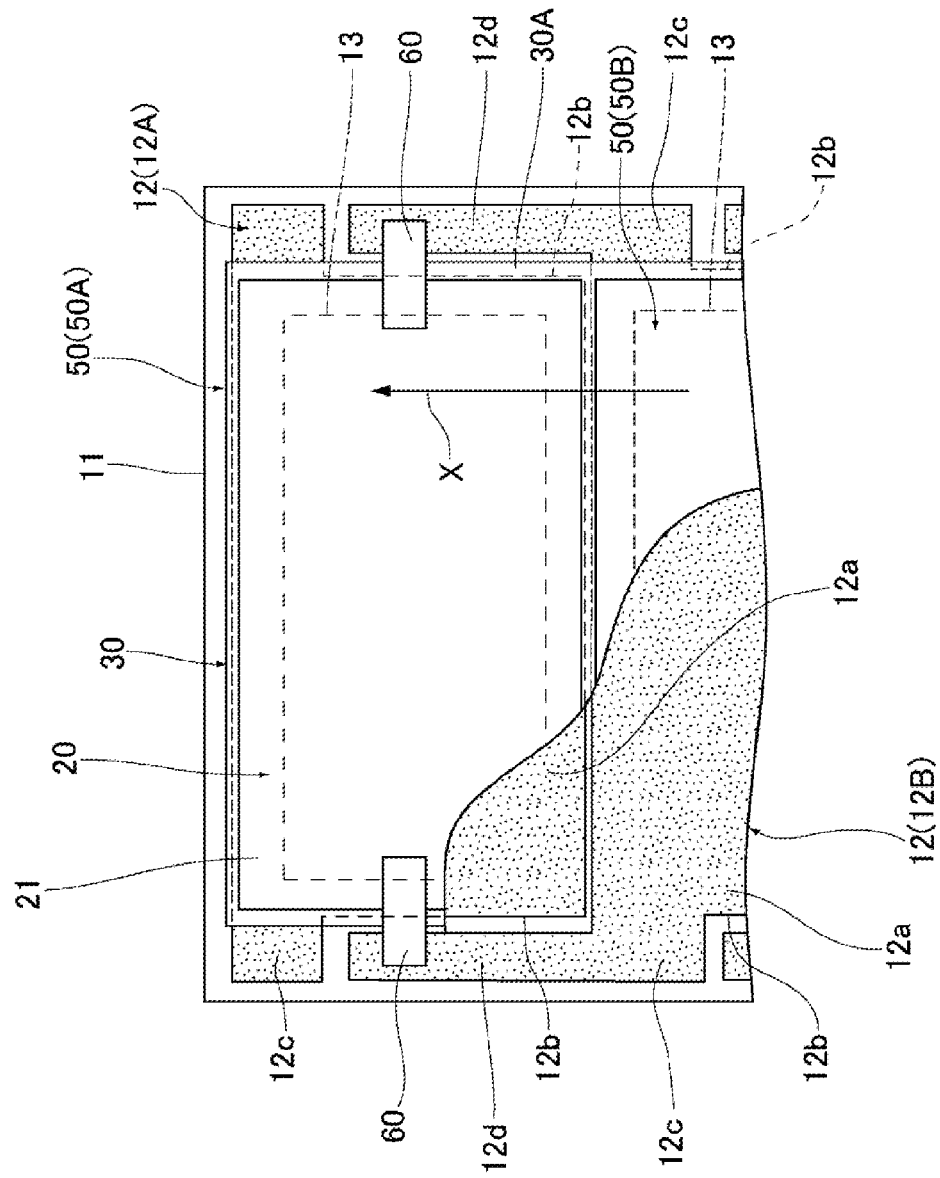
FIG. 3 is a partially cutaway partial bottom view of FIG. 1.

First, a first embodiment of the dye-sensitized solar cell module of the present invention will be described in detail with reference to the drawings. FIG. 1 is a bottom view illustrating the first embodiment of the dye-sensitized solar cell module of the present invention; FIG. 2 is a cross-sectional view of FIG. 1 cut along the II-II line; and FIG. 3 is a partially cutaway partial bottom view of FIG. 1.

As illustrated in FIG. 1, a dye-sensitized solar cell module (hereinafter, may be referred to as "DSC module") 100 includes plural (four in FIG. 1) dye-sensitized solar cells (hereinafter, may be referred to as "DSC") 50, and the plural DSC's 50 are connected in series. Hereinafter, for the convenience of explanation, the four DSC's 50 in the DSC module 100 may be referred to as DSC 50A to DSC 50D.

As illustrated in FIG. 2, each of the plural DSC's 50 includes a working electrode 10; a counter electrode 20 that faces the working electrode 10 and has a metal substrate 21; and a sealing section 30A that bonds the working electrode 10 and the counter electrode 20. A cell space C that is formed by the working electrode 10, the counter electrode 20, and the annular sealing section 30A is filled with an electrolyte 40.

The working electrode 10 includes a transparent conductive substrate 15 having a transparent substrate 11 and a transparent conductive film 12 that is provided on the transparent substrate 11; and at least one oxide semiconductor layer 13 that is provided on the transparent conductive film 12 of the transparent conductive substrate 15. The oxide semiconductor layer 13 is disposed inside the annular sealing section 30A. The transparent substrate 11 is used as a transparent substrate that is common to DSC 50A to DSC 50D. Furthermore, an insulating material 14 is provided between the transparent substrate 11 and the sealing section 30A. The insulating material 14 is directly fixed onto the transparent substrate 11. Hereinafter, for the convenience of explanation, the transparent conductive film 12 corresponding to DSC 50A to DSC 50D may be referred to as transparent conductive films 12A to 12D. Meanwhile, in the present embodiment, a first electrode is constituted of the transparent conductive substrate 15.

In the DSC module 100, the transparent conductive films 12A to 12D of the various DSC's 50 all have a rectangular-shaped main body section 12a indicated by a dashed line (see FIG. 1). As illustrated in FIG. 3, the main body section 12a includes two lateral edges 12b along the arrangement direction X of the plural dye-sensitized solar cells 50A to 50D. Also, for example, in two adjoining DSC 50A and DSC 50B, the transparent conductive film 12B in DSC 50B on one side includes two protruding sections 12c that protrude from both lateral edges 12b of the main body section 12a laterally to the arrangement direction X of DSC 50A to DSC 50D; and an extending section 12d that extends from each of the protruding section 12c to the side of the adjoining DSC 50A. Here, the extending section 12d is extended to a position lateral to the lateral edge 12b of the main body section 12a of the DSC 50A on the outside of the sealing section 30A of the DSC 50A. Specifically, the extending section 12d is disposed along the sealing section 30A of the DSC 50B, and the sealing section 30A of the DSC 50A on the other side. Then, the two extending sections 12d are disposed to have the main body section 12a of the transparent conductive film 12A in the adjoining DSC 50A sandwiched therebetween.

The extending section 12d of the transparent conductive film 12B in the DSC 50B and the metal substrate 21 of the counter electrode 20 in the DSC 50A on the other side are connected through a conductive material 60. The conductive material 60 is disposed so as to pass over the sealing section 30A. As the conductive material 60, a metal film is used in the present embodiment. As the metal material that constitutes the metal film, for example, silver or copper can be used.

As illustrated in FIG. 1, in the DSC 50C as well, the transparent conductive film 12C includes a protruding section 12c and an extending section 12d, in addition to the main body section 12a. Furthermore, also in the DSC 50D, the transparent conductive film 12D includes a protruding section 12c and an extending section 12d, in addition to the main body section 12a.

However, since the DSC 50A is already connected to the DSC 50B, and there are no other DSC's 50 that need to be connected thereto. Therefore, in the DSC 50A, the transparent conductive film 12A does not have an extending section 12d.

As illustrated in FIG. 2, the counter electrode 20 includes a metal substrate 21, and a catalyst layer 22 that is provided on the working electrode 10 side of the metal substrate 21 and accelerates a catalytic reaction. Furthermore, in two adjoining DSC's 50, the counter electrodes 20 are separated apart from each other. In the present embodiment, a second electrode is constituted of the counter electrode 20.

Figure 4:
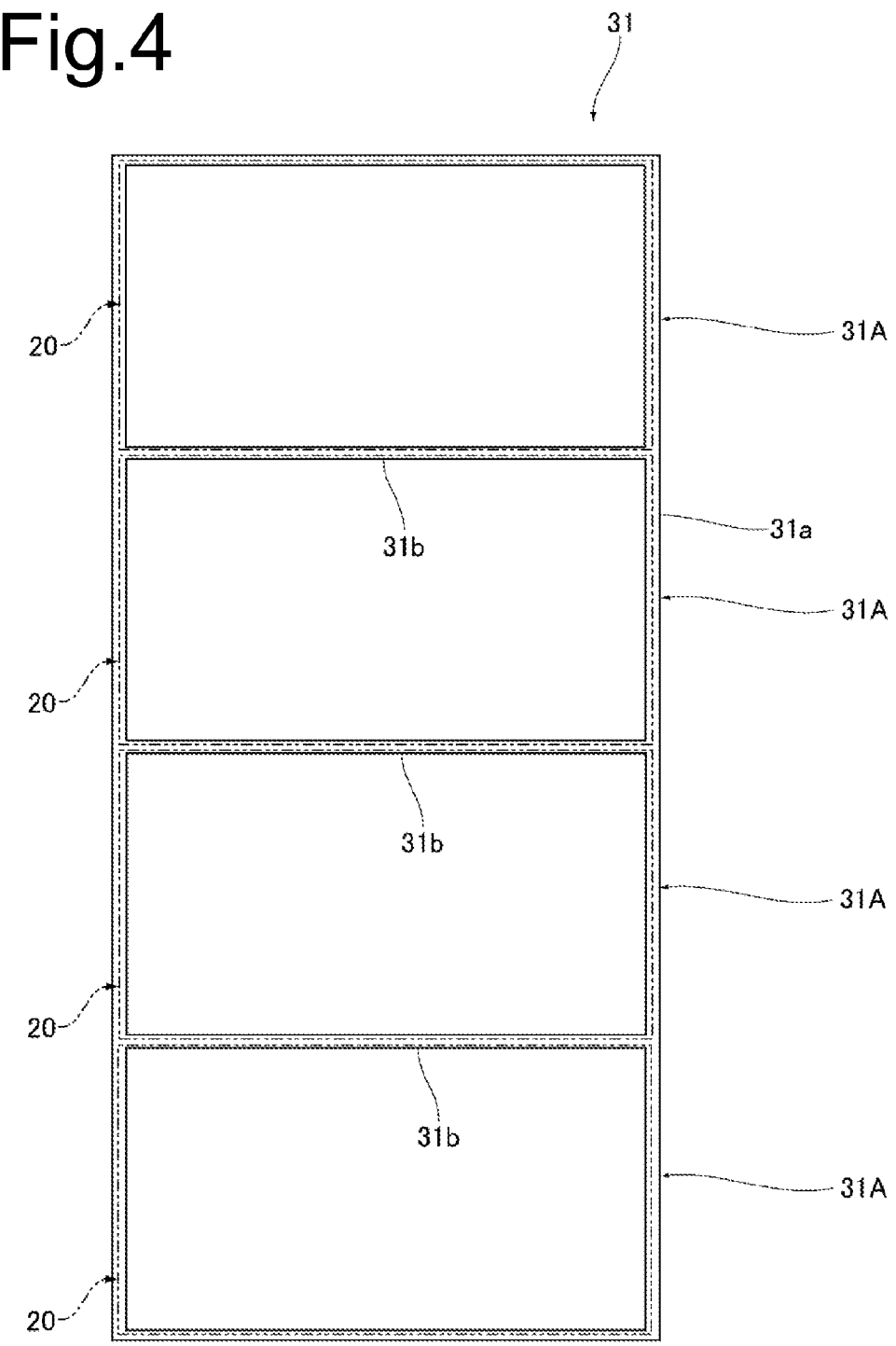
FIG. 4 is a plan view illustrating a first sealing section of FIG. 2.
Figure 5:
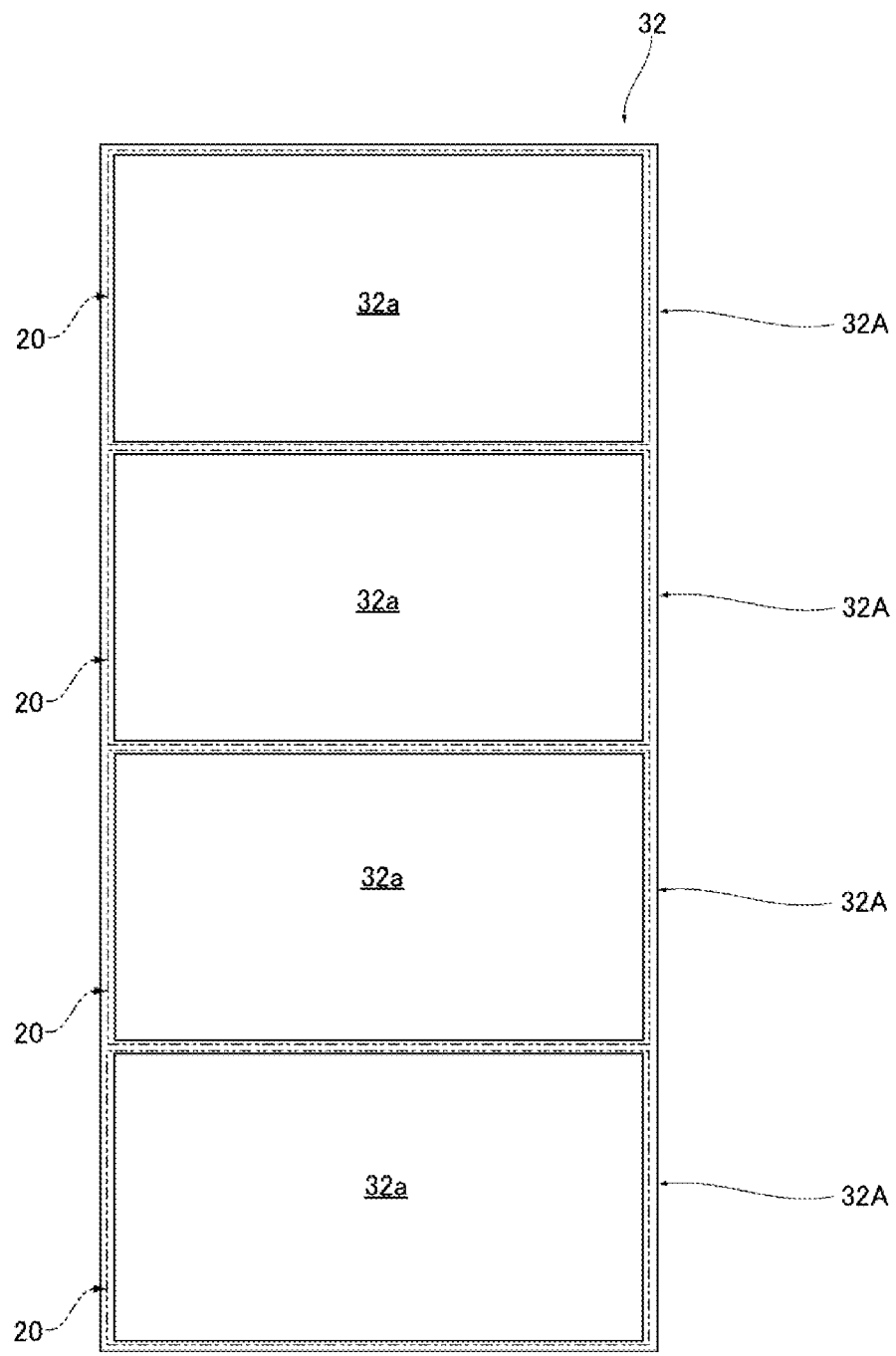
FIG. 5 is a plan view illustrating a second sealing section of FIG. 2.

The sealing section 30A includes an annular first sealing section 31A that is provided between the transparent conductive substrate 15 and the counter electrode 20 so as to overlap with the insulating material 14; and a second sealing section 32A that is provided so as to overlap with the first sealing section 31A, and sandwiches an edge 20a of the counter electrode 20 together with the first sealing section 31A. As illustrated in FIG. 4, adjoining first sealing sections 31A are integrated and constitute the first sealing section 31. In other words, the first sealing section 31 is composed of an annular region (hereinafter, referred to as "annular section") 31a that is not provided between two adjoining DSC's 50, and a region (hereinafter, referred to as "partition section") 31b that is provided between two adjoining DSC's 50 and partitions the annular region 31a. Also, as illustrated in FIG. 5, the second sealing sections 32A are integrated between adjoining counter electrodes 20, and the integrated second sealing sections 32A constitute the second sealing section 32. Meanwhile, the thickness of the insulating material 14 is larger than the thickness of the transparent conductive film 12, and the melting point of the insulating material 14 is higher than the melting point of the first sealing section 31A. In FIG. 5, reference numeral 32a represents an opening.

Furthermore, as illustrated in FIG. 2, in the DSC module 100, the second sealing section 32 includes a main body section 32b that is provided on the opposite side of the working electrode 10 in the counter electrode 20; and an adhesive section 32c that is provided between adjoining counter electrodes 20. The second sealing section 32 is adhered to the first sealing section 31 by the adhesive section 32c.

According to the DSC module 100, adjoining first sealing sections 31A are integrated together, and adjoining second sealing sections 32A are integrated together, between adjoining counter electrodes 20. Here, if adjoining first sealing sections 31A are not integrated, there will be two sites of the sealing section that are exposed to the atmosphere in the area between adjoining DSC's 50. On the contrary, in the DSC module 100, since adjoining first sealing sections 31A are integrated together, there will be one site of the sealing section that is exposed to the atmosphere in the area between adjoining DSC's 50. That is, since the first sealing section 31 is composed of the annular section 31a and the partition section 31b, the site of the sealing section that is exposed to the atmosphere in the area between adjoining DSC's 50 is constituted of only one site at the partition section 31b. Furthermore, as the first sealing sections 31A are integrated together, the distance of penetration of moisture and the like from the atmosphere to the electrolyte 40 increases. Therefore, the amount of moisture or air that penetrates from the outside of the DSC 50 can be sufficiently reduced in the area between adjoining DSC's 50. That is, the sealing ability of the DSC module 100 can be sufficiently enhanced. Furthermore, according to the DSC module 100, adjoining first sealing sections 31A are integrated together. Therefore, even if the partition section 31b is formed by integrating the first sealing sections 31A together while the sealing width is made smaller than the sealing width at the first sealing sections 31A that are not integrated, a sufficient sealing width can be secured for the partition section 31b. That is, the adhesive strength between the first sealing section 31A and the transparent conductive substrate 15, and the adhesive strength between the first sealing section 31A and the counter electrode 20 can be sufficiently increased while the aperture ratio is increased. As a result, the aperture ratio can be increased, and at the same time, even if in the case where, when the DSC module 100 is used at a high temperature, the electrolyte 40 expands and excessive stress is exerted from the inner side of the first sealing section 31A toward the outside, detachment of the first sealing section 31A from the transparent conductive substrate 15 and the counter electrode 20 can be sufficiently suppressed. Thus, the DSC module 100 can have excellent durability.

Furthermore, in the DSC module 100, the second sealing section 32A is adhered to the first sealing section 31A through the gap S between adjoining counter electrodes 20, and the edge 20a of the counter electrode 20 is sandwiched between the first sealing section 31A and the second sealing section 32A. Therefore, even if stress is exerted on the counter electrode 20 in a direction that is separated away from the working electrode 10, detachment of the electrodes is sufficiently suppressed by the second sealing section 32A. Furthermore, since the second sealing section 32A is adhered to the first sealing section 31A through the gap S between adjoining counter electrodes 20, the counter electrodes 20 of adjoining DSC's 50 are sufficiently prevented from being brought into contact with each other.

Furthermore, the thickness of the insulating material 14 is larger than the thickness of the transparent conductive film 12, and the insulating material 14 has a melting point higher than that of the first sealing section 31A. For this reason, for example, there are occasions in which the DSC module 100 is used at a high temperature, the first sealing section 31A is softened, and the space between the transparent conductive substrate 15 and the counter electrode 20 is narrowed. At this time, even if the counter electrode 20 comes closer to the transparent conductive film 12, since the thickness of the insulating material 14 is larger than the thickness of the transparent conductive film 12, and the insulating material 14 has a melting point higher than that of the first sealing section 31A, the contact between the counter electrode 20 and the transparent conductive film 12 is sufficiently prevented.

Furthermore, in the DSC module 100, the transparent conductive film 12 in one DSC 50 includes two protruding section 12c and an extending section 12d that is extended from each of the protruding sections 12c to the side of another DSC 50, and the extending section 12d is extended to a position lateral to a lateral edge 12b of the main body section 12a of the DSC 50A on the outside of the sealing section 30A of the DSC 50A. Then, the extending section 12d and the metal substrate 21 of the counter electrode 20 in another DSC 50 are connected through a conductive material 60. That is, in the DSC module 100, in two adjoining DSC's 50, the transparent conductive film 12 of one DSC 50 and the counter electrode 20 of another DSC 50 are connected on the outside of the light-receiving area including the sealing section 30A of all the DSC 50A to DSC 50D. In other words, the connection point that does not contribute to power generation in the DSC module 100 is provided on the outside of the light-receiving area. Therefore, the aperture ratio can be increased. Furthermore, since the transparent conductive film 12 of one DSC 50 and the counter electrode 20 of another DSC 50 are connected on the outside of the light-receiving area, the areas of the connection point between the transparent conductive film 12 and the conductive material 60, and the connection point between the counter electrode 20 and the conductive material 60 can also be enlarged. Furthermore, the extending section 12d of the transparent conductive film 12 in one DSC 50 is extended from the protruding section 12c to a position lateral to the lateral edge 12b of the main body section 12a of another DSC 50A on the outside of the sealing section 30A of the DSC 50A. That is, the transparent conductive film 12A of the DSC 50B is provided immediately close to the counter electrode 20 of an adjoining DSC 50A. Therefore, the conductive material 60 can be shortened, and the operator's hand is not easily caught by the conductive material 60. As a result, excessive stress being exerted on the connection point between the conductive material 60 and the counter electrode 20 or the connection point between the conductive material 60 and the transparent conductive film 12 can be prevented, and thus the connection reliability in the DSC module 100 can be sufficiently enhanced. Furthermore, since the conductive material 60 is sufficiently prevented from being brought into contact with the counter electrode 20 of an adjoining DSC 50, adjoining counter electrodes 20 are sufficiently prevented from being electrically connected by the conductive material 60. As a result, defective operation of the DSC module 100 can also be sufficiently prevented.

Furthermore, in the DSC module 100, in two adjoining DSC's 50, the counter electrode 20 of one DSC 50 and the extending section 12d of the transparent conductive film 12 of another DSC 50 are connected by the conductive material 60 that is formed from a metal film. Therefore, the surface asperity at the surface of the counter electrode 20 on the opposite side of the working electrode 1 can be reduced, and the DSC module 100 can be stably installed on a flat surface such as the inner wall surface of a casing.

Next, a method for producing the DSC module 100 will be described.

First, a transparent conductive substrate 15 is prepared by forming a transparent conductive film 12 on one transparent substrate 11.

The material that constitutes the transparent substrate 11 may be, for example, any transparent material, and examples of such a transparent material include glasses such as borosilicate glass, soda lime glass, glass which is made of soda lime and whose iron component is less than that of ordinary soda lime glass, and quartz glass; polyethylene terephthalate (PET), polyethylene naphthalate (PEN), polycarbonate (PC), and polyether sulfone (PES). The thickness of the transparent substrate 11 is appropriately determined according to the size of the DSC module 100, and without being particularly limited, for example, the thickness may be in the range of 50 μm to 10,000 μm.

Examples of the material that constitutes the transparent conductive film 12 include conductive metal oxides such as indium tin oxide (ITO), tin oxide ($SnO_2$), and fluorine-doped tin oxide (FTO). The transparent conductive film 12 may be constituted of a single layer, or may be constituted of a laminate of plural layers formed of different conductive metal oxides. When the transparent conductive film 12 is constituted of a single layer, since the transparent conductive film 12 has high heat resistance and high chemical resistance, it is preferable that the transparent conductive film 12 be formed of FTO. Furthermore, when a laminate constituted of plural layers is used as the transparent conductive film 12, it is preferable because the characteristics of the various layers can be reflected. Particularly, it is preferable to use a laminate of a layer formed of ITO and a layer formed of FTO. In this case, a transparent conductive film 12 having high conductivity, heat resistance and chemical resistance can be realized. The thickness of the transparent conductive film 12 may be adjusted to, for example, 0.01 μm to 2 μm.

As the method for forming the transparent conductive film 12, a sputtering method, a vapor deposition method, a spray pyrolysis deposition (SPD) method, a CVD method or the like is used.

Next, the transparent conductive film 12 is subjected to patterning as described below using, for example, a YAG laser or a $CO_2$ laser. That is, patterning is carried out such that the four transparent conductive films 12A to 12D corresponding to the DSC 50A to DSC 50D each have a rectangular-shaped main body section 12a and a protruding section 12c. At this time, for the transparent conductive films 12B to 12D corresponding to the DSC 50B to DSC 50, patterning is carried out such that not only the rectangular-shaped main body section 12a and the protruding section 12c but also the extending section 12d that extends from the protruding section 12c toward the side of an adjoining DSC 50, is formed.

Next, an oxide semiconductor layer 13 is formed on the main body section 12a of the transparent conductive film 12. The oxide semiconductor layer 13 is formed by printing a paste for forming a porous oxide semiconductor layer which contains oxide semiconductor particles, and then calcining the paste.

The paste for forming an oxide semiconductor layer contains a resin such as polyethylene glycol, and a solvent such as terpineol, in addition to the oxide semiconductor particles. The oxide semiconductor particles are formed of, for example, titanium oxide ($TiO_2$), silicon oxide ($SiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$), or two or more kinds thereof.

The thickness of the oxide semiconductor layer 13 may be adjusted to, for example, 0.5 μm to 50 μm.

As the method for printing the paste for forming an oxide semiconductor layer, for example, a screen printing method, a doctor blade method, a bar coating method, or the like can be used.

The calcination temperature may vary with the material of the oxide semiconductor particles, but the calcination temperature is usually 350° C. to 600° C. The calcination time may also vary with the material of the oxide semiconductor particles, but the calcination time is usually 1 hour to 5 hours.

Next, an insulating material 14 that is disposed between adjoining DSC's 50 is directly fixed onto the transparent substrate 11. The insulating material 14 is provided in order to prevent the transparent conductive film 12 on the transparent substrate 11 from being brought into contact with the counter electrode 20 and being short-circuited. Therefore, the insulating material 14 is desirably a material having a melting point higher than that of the first sealing section 31A.

As the insulating material 14, for example, an inorganic material such as a low melting point glass, a polyimide, a resin cured by a ultraviolet ray, a thermoplastic resin or the like is used. Among them, in view of effectively preventing leakage of the electrolyte 40, an inorganic material is preferred.

The thickness of the insulating material 14 is usually 1 μm to 200 μm, and preferably 3 μm to 10 μm.

In this manner, a working electrode 10 is obtained.

Next, a photosensitized dye is supported in the oxide semiconductor layer 13 of the working electrode 10. To this end, a photosensitized dye may be adsorbed to the oxide semiconductor layer 13 by immersing the working electrode 10 in a solution containing the photosensitized dye, thereby adsorbing the photosensitized dye to the oxide semiconductor layer 13, subsequently washing away any excess photosensitized dye with the solvent component of the solution, and drying the working electrode. However, the photosensitized dye can be supported in the oxide semiconductor layer 13 even if the photosensitized dye is adsorbed to the oxide semiconductor layer 13 by applying a solution containing the photosensitized dye on the oxide semiconductor layer 13 and then drying.

Examples of the photosensitized dye include ruthenium complexes having a ligand containing a bipyridine structure, a terpyridine structure or the like; and organic dyes such as porphyrin, eosin, rhodamine, and merocyanine.

Next, an electrolyte 40 is disposed on the oxide semiconductor layer 13.

The electrolyte 40 contains, for example, a redox couple such as $I^-/I_3^-$, and an organic solvent. Examples of the organic solvent that can be used include acetonitrile, methoxyacetonitrile, methoxypropionitrile, propionitrile, ethylene carbonate, propylene carbonate, diethyl carbonate, and γ-butyrolactone. Examples of the redox couple include couples of $I^-/I_3^-$ and bromine/bromide ion. Meanwhile, a gelling agent may also be added to the volatile solvent. Furthermore, the electrolyte 40 may be composed of an ionic liquid electrolyte formed from a mixture of an ionic liquid and a volatile component. Examples of the ionic liquid include a normal temperature molten salt that is already known iodine salts such as pyridinium salt, imidazolium salt and triazolium salt, and is in a molten state at near room temperature. As such a normal temperature molten salt, for example, 1-ethyl-3-methylimidazolium bis(trifluoromethylsulfonyl)imide is suitably used. Furthermore, examples of the volatile component include the organic solvents described above; LiI, $I_2$, 4-t-butylpyridine, and N-methylbenzimidazole.

Figure 6:
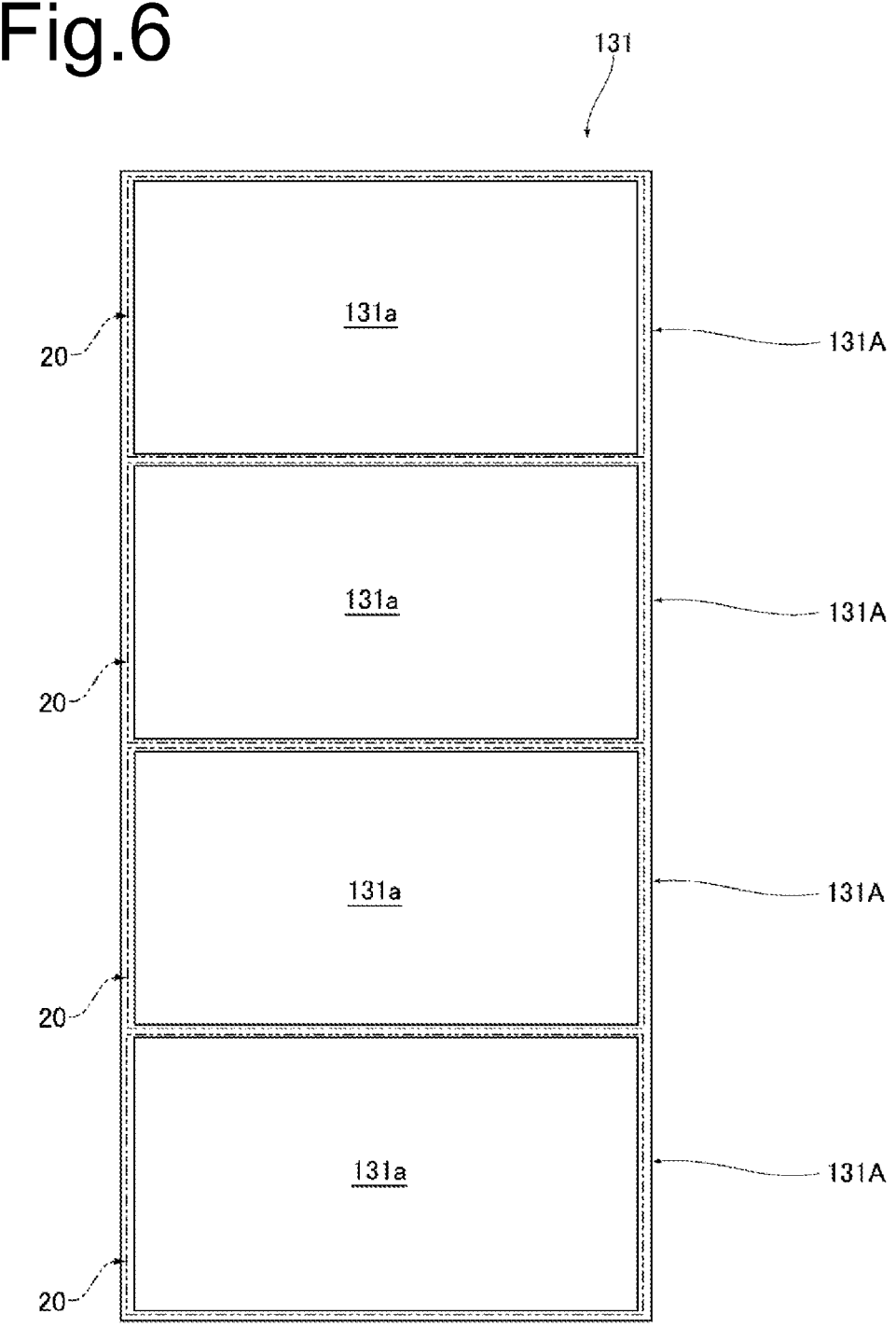
FIG. 6 is a plan view illustrating a first sealing section-forming body for forming the first sealing section of FIG. 4.

Next, as illustrated in FIG. 6, a first sealing section-forming body 131 for forming a first sealing section 31 is prepared. The first sealing section-forming body 131 can be obtained by preparing one sheet of a resin film for sealing, and forming rectangular-shaped openings 131a in accordance with the number of the DSC's 50 in the resin film for sealing. The first sealing section-forming body 131 has a structure in which plural first sealing section-forming bodies 131A are integrated together.

Examples of the resin film for sealing include resins such as an ionomer, an ethylene-anhydrous vinyl acetate copolymer, an ethylene-methacrylic acid copolymer, an ethylene-vinyl alcohol copolymer, a resin cured by a ultraviolet ray, and a polyvinyl alcohol.

This first sealing section-forming body 131 is then adhered onto the working electrode 10. At this time, the first sealing section-forming body 131 is adhered to the working electrode 10 so as to overlap with the insulating material 14. The adhesion of the first sealing section-forming body 131 to the working electrode 10 can be carried out by heating and melting the first sealing section-forming body 131. Furthermore, the first sealing section-forming body 131 is adhered to the working electrode 1 such that the main body section 12a of the transparent conductive film 2 is disposed on the inner side of the first sealing section-forming body 131.

Next, plural counter electrodes 20 are prepared.

As described above, the counter electrode 20 includes a metal substrate 21, and a conductive catalyst layer 22 that is provided on the working electrode 10 side in the metal substrate 21 and accelerates a reduction reaction at the surface of the counter electrode 20.

The metal substrate 21 is formed of, for example, a corrosion resistant metal material such as titanium, nickel, platinum, molybdenum, tungsten, aluminum, or stainless steel; or a substrate obtained by forming a film formed from a conductive oxide such as ITO or FTO on the transparent substrate 11 described above. The thickness of the metal substrate 21 is appropriately determined depending on the size of the DSC module 100 and is not particularly limited, but for example, the thickness may be adjusted to 0.005 mm to 0.1 mm.

The catalyst layer 22 is formed of platinum, a carbon-based material, a conductive polymer, or the like. Here, as the carbon-based material, carbon nanotubes are suitably used.

Next, another one of the first sealing section-forming body 131 described above is prepared. Each of the plural counter electrodes 20 is bonded so as to block each of the openings 131a of the first sealing section-forming body 131.

Next, the first sealing section-forming body 131 attached to the counter electrode 20 and the first sealing section-forming body 131 attached to the working electrode 10 are superimposed, and the first sealing section-forming bodies 131 are heated to melt while being pressed. In this manner, a first sealing section 31 is formed between the working electrode 10 and the counter electrode 20. The formation of the first sealing section 31 may be carried out at atmospheric pressure or under reduced pressure, but the formation of the first sealing section 31 is preferably carried out under reduced pressure.

Next, as illustrated in FIG. 5, a second sealing section 32 is prepared. The second sealing section 32 has a structure in which plural first sealing sections 32A are integrated together. The second sealing section 32 can be obtained by preparing one sheet of a resin film for sealing, and forming rectangular-shaped openings 32a in accordance with the number of the DSC's 50 in the resin film for sealing. The second sealing section 32 is bonded to the counter electrode 20 such that the second sealing section 32, together with the first sealing section 31, has an edge 20a of the counter electrode 20 interposed therebetween. The adhesion of the second sealing section 32 to the counter electrode 20 can be carried out by heating and melting the second sealing section 32.

Examples of the resin film for sealing include resins such as an ionomer, an ethylene-anhydrous vinyl acetate copolymer, an ethylene-methacrylic acid copolymer, an ethylene-vinyl alcohol copolymer, a resin cured by a ultraviolet ray, and a polyvinyl alcohol. The constituent material of the resin film for sealing intended for forming the second sealing section 32 preferably has a melting point higher than that of the constituent material of the resin film for sealing intended for forming the first sealing section 31. In this case, since the second sealing section 32A becomes harder than the first sealing section 31A, the contact between the counter electrodes 20 of adjoining DSC's 50 can be effectively prevented. Furthermore, since the first sealing section 31A becomes softer than the second sealing section 32A, the stress exerted to the sealing section 30A can be effectively relieved.

Lastly, a paste containing the metal material that constitutes the conductive material 60 is prepared, and this paste is applied from the counter electrode 20 over the extending section 12d of the transparent conductive film 12 of an adjoining DSC 50, and cured. At this time, from the viewpoint of avoiding the adverse effect on the photosensitized dye, it is preferable to use a low temperature curable type paste which is capable of curing at a temperature of 90° C. or lower as the paste. In this manner, a conductive material 60 that connects the counter electrode 20 and the transparent conductive film 12 of an adjoining DSC 50 can be obtained (see FIG. 1).

In this manner, the DSC module 100 is obtained.

Second Embodiment

Figure 7:
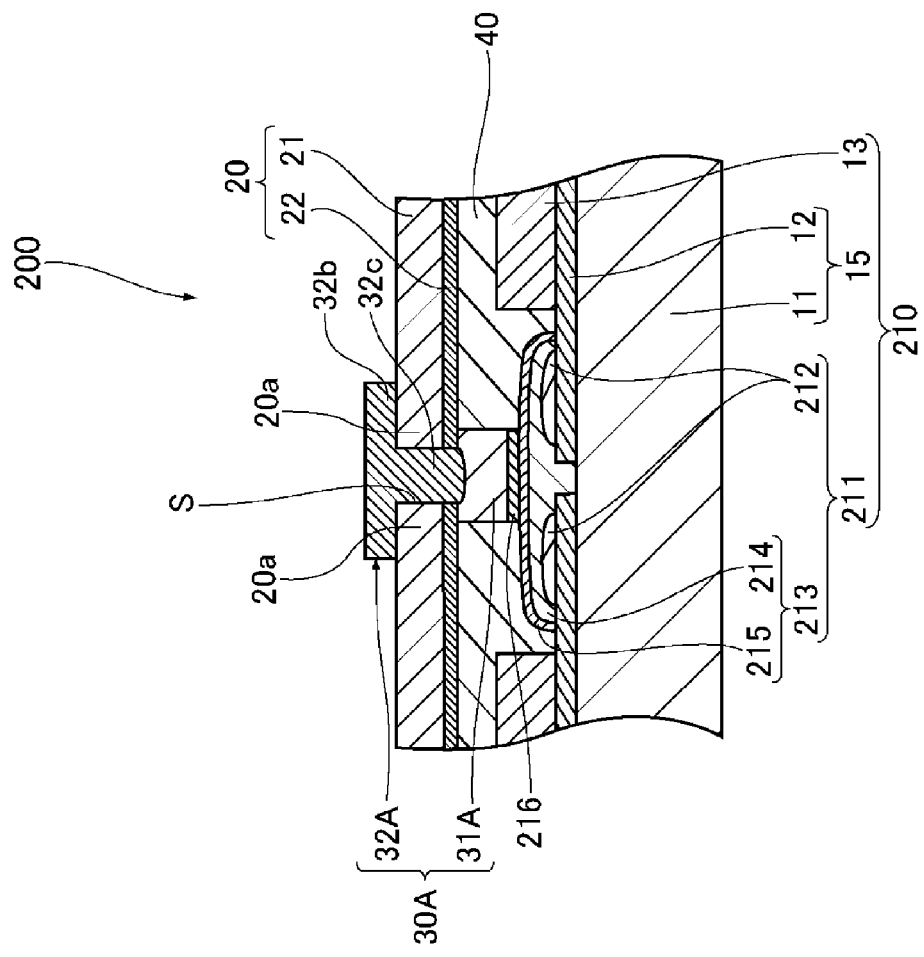
FIG. 7 is a partial cross-sectional view illustrating a second embodiment of the dye-sensitized solar cell module of the present invention.

Next, the second embodiment of the DSC module of the present invention will be described in detail with reference to FIG. 7. FIG. 7 is a partial cross-sectional view illustrating a second embodiment of the present invention. Meanwhile, in FIG. 7, the same symbols will be assigned for the same or equivalent constituent elements as those of the first embodiment, respectively, and any overlapping descriptions will not be repeated here.

As illustrated in FIG. 7, a DSC module 200 of the present embodiment is different from the DSC module 100 of the first embodiment in that the working electrode 210 includes, between the first sealing section 31A and the transparent substrate 11, a wiring section 211 that is provided to join the transparent conductive films 12 of adjoining DSC's 50, and a low heat conductive layer 216 that is provided between the wiring section 211 and the first sealing section 31A, instead of the insulating material 14.

The wiring section 211 includes a current collector wire 212 that is provided on each of the transparent conductive film 12 of adjoining DSC's 50, and a wiring protective layer 213 that protects the current collector wire 212 from the electrolyte 40. The wiring protective layer 213 includes a first wiring protective layer 214 that protects the current collector wire 212 from the electrolyte 40 by covering the current collector wire 212 and is directly brought into contact with the transparent substrate 11, and a second wiring protective layer 215 that protects the current collector wire 212 from the electrolyte 40 by covering the first wiring protective layer 214.

The low heat conductive layer 216 is formed of a low heat conductive material having lower heat conductivity than the materials that respectively constitute the first sealing section 31A and the wiring protective layer 213. As such a low heat conductive material, for example, when polyethylene is used for the first sealing section 31A, glass is used for the first wiring protective layer 214, and polyimide is used for the second wiring protective layer 215, a resin such as polypropylene or polystyrene can be used.

The thickness of the low heat conductive layer 216 is, for example, 20 μm to 60 μm.

According to the DSC module 200 of the present embodiment, a low heat conductive layer 216 having lower heat conductivity than the first sealing section 31A and the wiring protective layer 213 is provided between the first sealing section 31A and the wiring protective layer 213. For this reason, even if a certain DSC 50 is locally heated to a high temperature by the heat of sunlight or the like, and low heat conductive layer 216 is locally heated to a high temperature, since the low heat conductive layer 216 has lower heat conductivity than the first sealing section 31A and the wiring protective layer 213, fluidity of the low heat conductive layer does not easily decrease. Therefore, the relative positional relationship between the counter electrodes 20 of adjoining DSC's can be sufficiently retained. That is, since the fluidity of the low heat conductive layer 216 does not easily decrease, the edge 20a of the counter electrode 20 is more sufficiently suppressed from being brought closer to the transparent conductive film 12. Therefore, the contact between the counter electrodes 20 is also more sufficiently suppressed.

Here, the difference between the heat conductivity of the low heat conductive layer 216 and the heat conductivity of the layer having the lowest heat conductivity between the first sealing section 31A and the wiring protective layer 213 is preferably 0.1 W/m·K or more, more preferably 0.10 W/m·K to 0.6 W/m·K, and even more preferably 0.15 W/m·K to 0.4 W/m·K. In this case, the relative positional relationship between the counter electrodes 20 of adjoining DSC's 50 can be more sufficiently retained.

Next, the method for producing the DSC module 200 will be described.

The method for producing the DSC module 200 is different from the method for producing the DSC module 100 of the first embodiment in that between the first sealing section 31A and the transparent substrate 11, the wiring section 211 and the low heat conductive layer 216 are sequentially formed instead of forming the insulating material 14.

The wiring section 211 is carried out before the process of adhering the first sealing section-forming body 131 to the working electrode 10. Specifically, in regard to the wiring section 211, current collector wires 212 are formed respectively on adjoining two transparent conductive films 12, and then the wiring protective layer 213 is formed so as to cover these current collector wires 212. At this time, the current collector wire 212 can be formed by applying a paste containing silver or the like on the surface of the transparent conductive film 12, drying the paste, and then calcining the paste. Furthermore, the first wiring protective layer 214 can be formed by applying a paste containing the material that constitutes the first wiring protective layer 214 on the surfaces of the current collector wire 211, transparent conductive film 12 and transparent substrate 11, drying the paste, and then calcining the paste as necessary. The second wiring protective layer 215 can be obtained by applying a paste containing the material that constitutes the second wiring protective layer 215 on the surface of the first wiring protective layer 214, drying the paste, and then calcining the paste as necessary.

The low heat conductive layer 216 can be formed by applying a paste containing the low heat conductive material on the surface of the wiring protective layer 213, and drying the paste.

Meanwhile, in the method for producing the DSC module 200, the counter electrode 20 may be produced by preparing in advance plural counter electrodes 20 as in the case of the first embodiment; however, it is preferable to produce the counter electrode 20 as follows from the viewpoint of enhancing the production efficiency.

Figure 8:
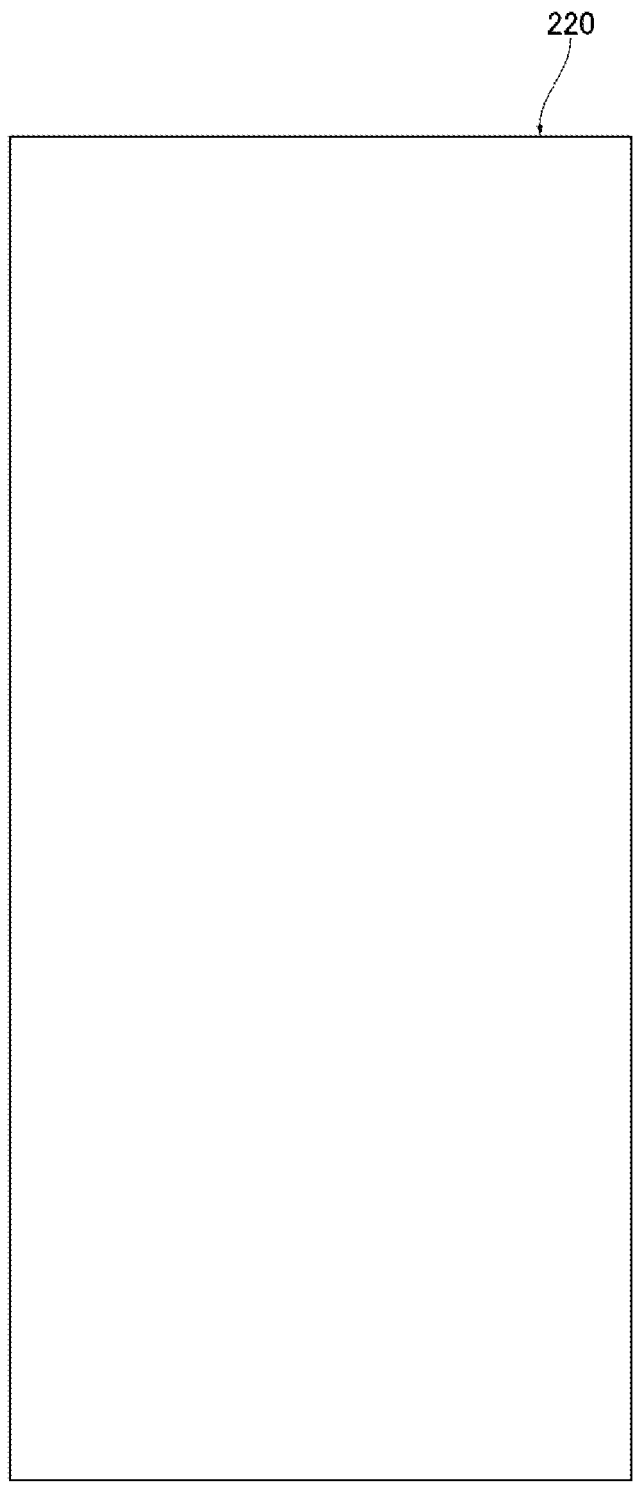
FIG. 8 is a plan view illustrating a counter electrode-forming body for forming a counter electrode of the dye-sensitized solar cell module of FIG. 7.

That is, first, as illustrated in FIG. 8, one sheet of a counter electrode-forming body 220 is prepared. This one sheet of the counter electrode-forming body 220 is bonded so as to block the entire opening 131a of the first sealing section-forming body 131.

Next, the first sealing section-forming body 131 adhered to the counter electrode-forming body 220 and the first sealing section-forming body 131 adhered to the working electrode 10 are superimposed, and the first sealing section-forming bodies 131 are heated to melt under pressure. In this manner, the first sealing section 31A is formed between the working electrode 10 and the counter electrode-forming body 220.

Figure 9:
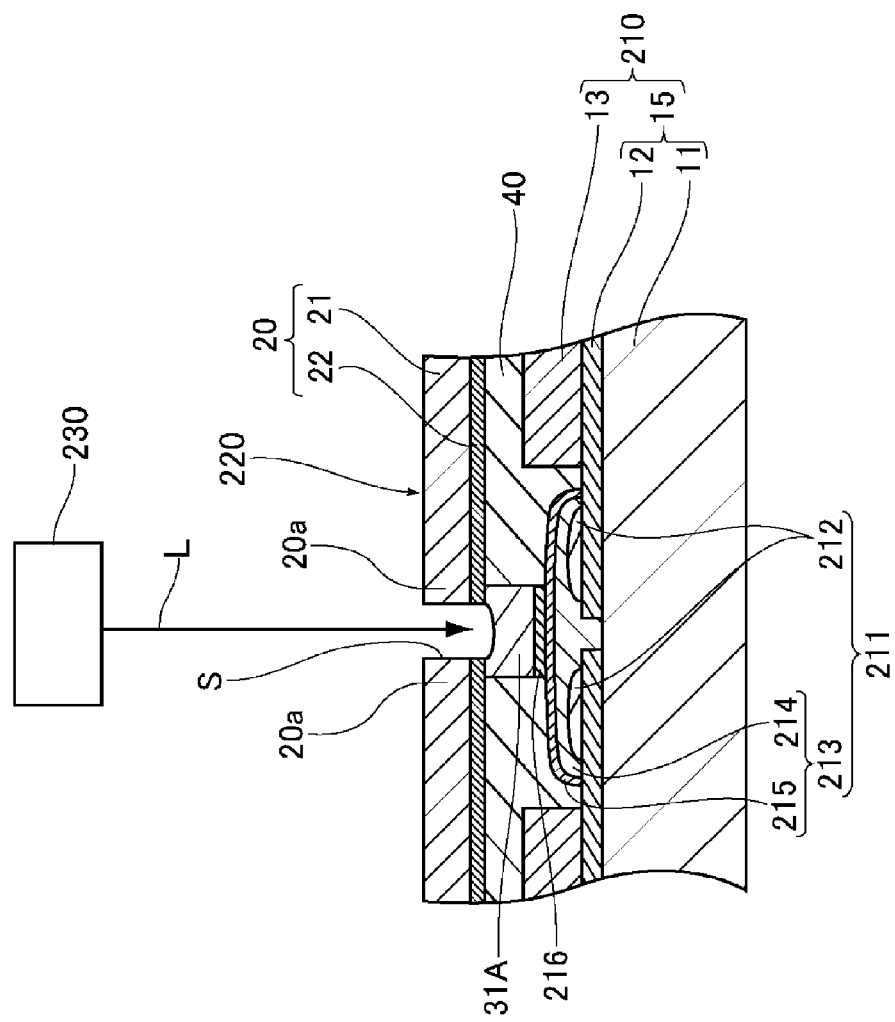
FIG. 9 is a diagram illustrating the state in which the counter electrode-forming body of FIG. 8 is cut to be divided into plural counter electrodes.

Next, the counter electrode-forming body 220 is divided into plural counter electrodes 20 by cutting the counter electrode-forming body 220 by laser processing. Specifically, as illustrated in FIG. 9, the portion that is in contact with the first sealing section 31A in the counter electrode-forming body 220 is irradiated with laser light L from a laser light source 230, and thereby the counter electrode-forming body 220 is divided by cutting into plural counter electrodes 20.

Here, cutting of the counter electrode-forming body 220 is carried out by causing the cut portion to generate heat and melting the cut portion. At this time, since a low heat conductive layer 216 having lower heat conductivity than the first sealing section 31A is provided between the first sealing section 31A and the wiring protective layer 213 of the wiring section 211, during the process of cutting the counter electrode-forming body 220, diffusion of the heat of the cut portion is sufficiently suppressed. For this reason, the counter electrode-forming body 220 can be efficiently cut.

As the laser light source 230, a pulse laser light source is used.

The wavelength of the laser light L may be 1000 nm or more, preferably 1000 nm to 2000 nm, and more preferably 1000 nm to 1200 nm.

The pulse width of the laser light L is not particularly limited, but the pulse width is usually 150 ns or less, and preferably 100 ns or less. However, the pulse width is preferably 5 ns or more. In this case, a more sufficient amount of heat can be added to the cut portion of the counter electrode-forming body 220.

The energy irradiated per unit scanning distance is preferably set to 0.01 J/mm to 0.3 J/mm, and more preferably to 0.06 J/mm to 0.09 J/mm. When the energy irradiated per unit scanning distance is adjusted to 0.01 J/mm to 0.3 J/mm, other members such as the first sealing section 31A can be cut without damaging the members, and the number of cutting can be reduced.

The number of cutting per one site may be one time or plural times, but it is preferable that the number of cutting be one time from the viewpoint of production efficiency.

Third Embodiment

Figure 10:
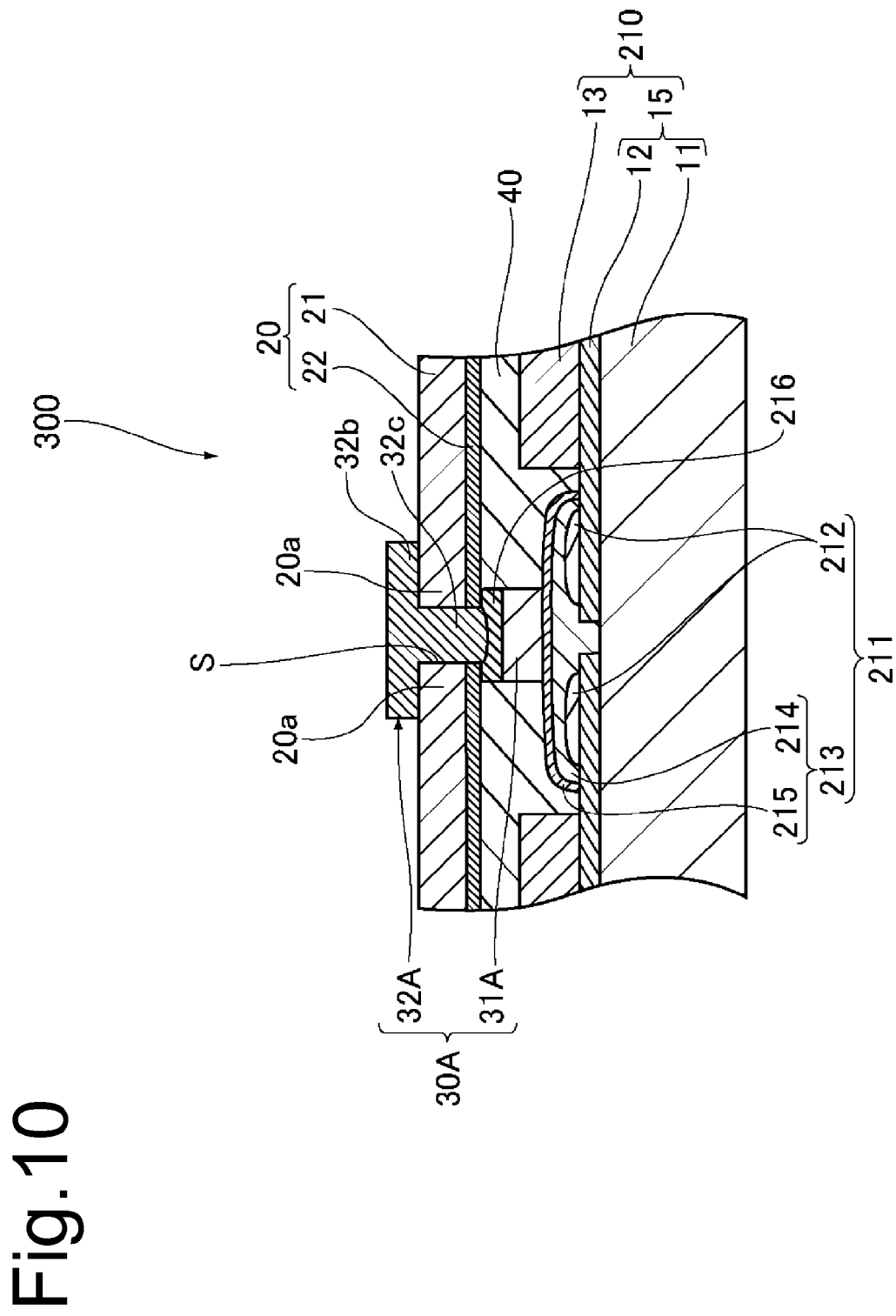
FIG. 10 is a partial cross-sectional view illustrating a third embodiment of the dye-sensitized solar cell module of the present invention.

Next, a third embodiment of the DSC module of the present invention will be described in detail with reference to FIG. 10. FIG. 10 is a partial cross-sectional view illustrating the third embodiment of the DSC module of the present invention. Meanwhile, in FIG. 10, the same symbols will be assigned to the same or equivalent constituent elements as those of the first and second embodiments, respectively, and any overlapping descriptions will not be repeated.

As illustrated in FIG. 10, the DSC module 300 of the present embodiment is different from the DSC module 200 of the second embodiment in that the low heat conductive layer 216 is provided between the first sealing section 31A and the counter electrode 20, instead of between the first sealing section 31A and the transparent substrate 11.

According to the DSC module 300 of the present embodiment, a low heat conductive layer 216 having lower heat conductivity than the first sealing section 31A and the wiring protective layer 213 is provided between the first sealing section 31A and the counter electrode 20. Therefore, even if a certain DSC 50 is locally heated to a high temperature by the heat of sunlight or the like, and the low heat conductive layer 216 is locally heated to a high temperature, since the low heat conductive layer 216 has lower heat conductivity than the first sealing section 31A and the wiring protective layer 213, fluidity of the low heat conductive layer does not easily decrease. For this reason, the relative positional relationship between the counter electrodes 20 of adjoining DSC's 50 can be sufficiently retained. That is, since the fluidity of the low heat conductive layer 216 does not easily decrease, the edge 20a of the counter electrode 20 is more sufficiently suppressed from being brought closer to the transparent conductive film 12. Therefore, the contact between the counter electrodes 20 can be more sufficiently suppressed.

Here, the difference between the heat conductivity of the low heat conductive layer 216 and the heat conductivity of the layer having the lowest heat conductivity between the first sealing section 31A and the wiring protective layer 213 is, for the same reason as that for the second embodiment, preferably 0.1 W/m·K or more, more preferably 0.1 W/m·K to 0.6 W/m·K, and even more preferably 0.15 W/m·K to 0.4 W/m·K.

Next, the method for producing the DSC module 300 will be described.

The method for producing the DSC module 300 is different from the method for producing the DSC module 200 of the second embodiment in that the low heat conductive layer 216 is fixed not to the working electrode 10 before the process of adhering the first sealing section-forming body 131 to the working electrode 10, but to the counter electrode 20 before the process of adhering the first sealing section-forming body 131 to the counter electrode 20.

Meanwhile, also in the method for producing the DSC module 300, it is preferable to produce the counter electrode 20 by irradiating laser light L from a laser light source 230 as in the case of the method for producing the DSC module 200 of the second embodiment, from the viewpoint of enhancing the production efficiency.

Figure 11:
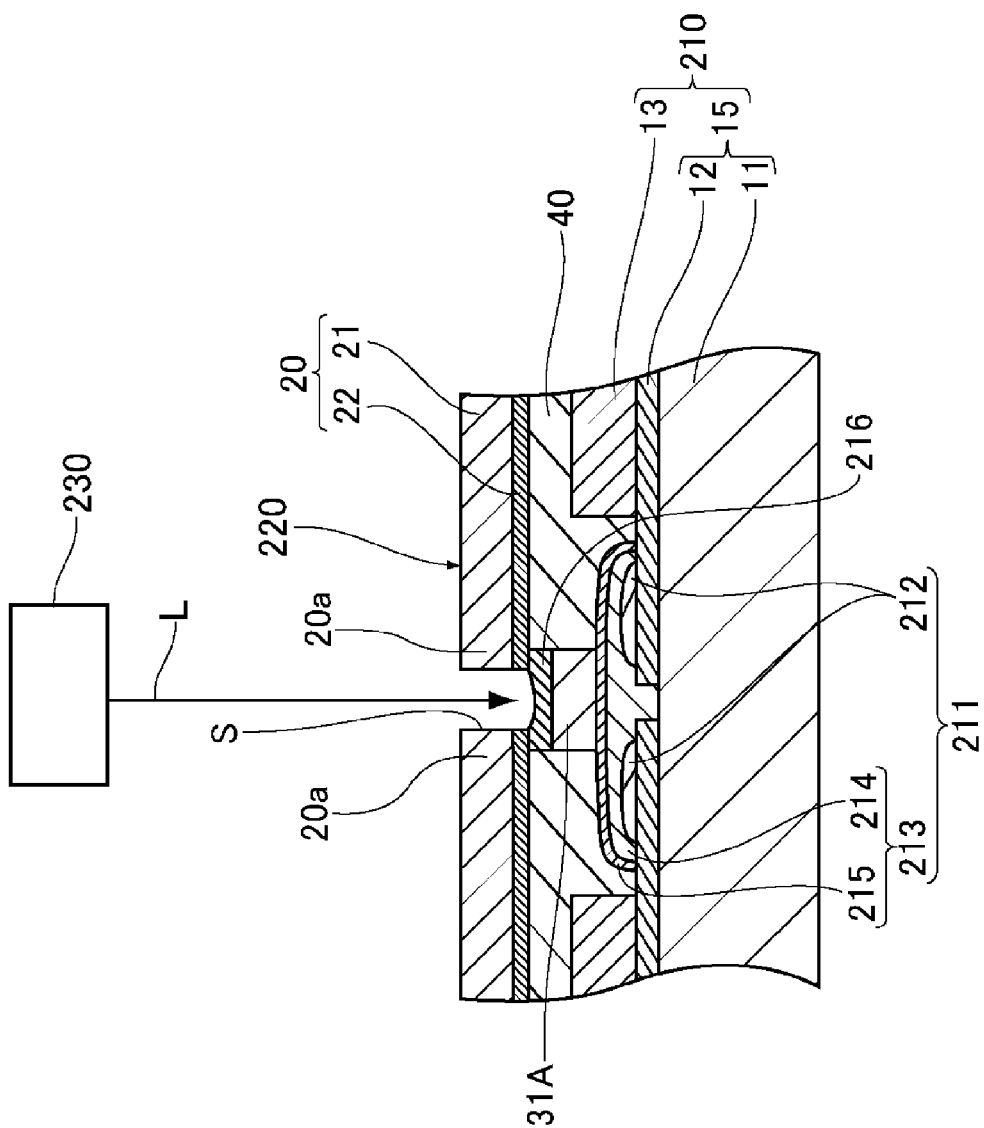
FIG. 11 is a diagram illustrating the state in which the counter electrode-forming body of FIG. 10 is cut to be divided into plural counter electrodes.

Here, as illustrated in FIG. 11, cutting of the counter electrode-forming body 220 for forming the counter electrode 20 is carried out by causing the cut portion to generate heat and melting the cut portion. At this time, since a low heat conductive layer 216 having lower heat conductivity than the first sealing section 31A is provided between the first sealing section 31 and the counter electrode-forming body 220, during process of cutting the counter electrode-forming body 220, diffusion of the heat of the cut portion is sufficiently suppressed.

Particularly, in the present embodiment, unlike the second embodiment, the low heat conductive layer 216 is in direct contact with the counter electrode-forming body 220. For this reason, during the process of cutting the counter electrode-forming body 220, diffusion of the heat generated at the cut site is effectively suppressed, and the counter electrode-forming body 220 can be more efficiently cut.

Fourth Embodiment

Figure 12:
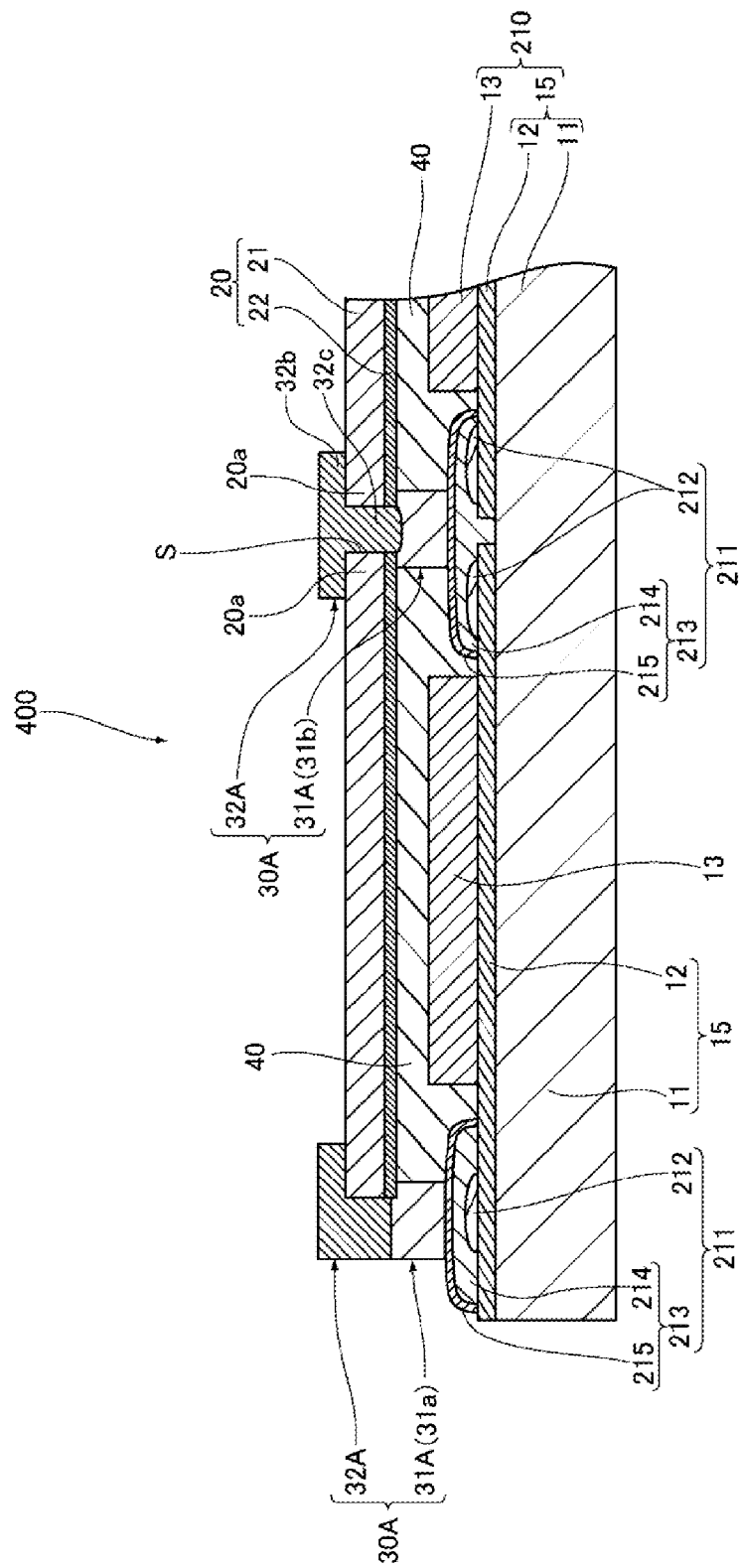
FIG. 12 is a partial cross-sectional view illustrating a fourth embodiment of the dye-sensitized solar cell module of the present invention.

Next, a fourth embodiment of the DSC module of the present invention will be described in detail with reference to FIG. 12. FIG. 12 is a partial cross-sectional view illustrating the fourth embodiment of the dye-sensitized solar cell module of the present invention. Meanwhile, in FIG. 12, the same symbols will be assigned for the same or equivalent constituent elements as those of the first to third embodiments, respectively, and any overlapping descriptions will not be repeated here.

As illustrated in FIG. 12, the DSC module 400 of the present embodiment is different from the DSC module 200 of the second embodiment in that the DSC module 400 does not include a low heat conductive layer 216 between the first sealing section 31A and the wiring protective layer 213, and the partition section 31b in the first sealing section 31 is formed of a low heat conductive material having lower heat conductivity than the annular section 31a.

According to the DSC module 400 of the present embodiment, even if a certain DSC 50 is locally heated to a high temperature by the heat of sunlight or the like, and the partition section 31b in the first sealing section 31 is locally heated to a high temperature, since the partition section 31b that has been heated to a high temperature has lower heat conductivity than the annular section 31a that is not provided between two adjoining DSC's 50, it is difficult for the heat to be transferred to adjoining DSC's 50, and deterioration of the adjoining DSC's 50 can be sufficiently suppressed.

Meanwhile, the material that constitutes the annular section 31a of the first sealing section 31 is appropriately selected from resins such as an ionomer, an ethylene-anhydrous vinyl acetate copolymer, an ethylene-methacrylic acid copolymer, an ethylene-vinyl alcohol copolymer, a resin cured by a ultraviolet ray, and a polyvinyl alcohol. The material that constitutes the partition section 31b of the first sealing section 31 may be any low heat conductive material having lower heat conductivity than the material that constitutes the annular section 31a, and examples thereof include resins such as polypropylene and polystyrene.

In regard to the first sealing section 31 in the DSC module 400 of the present embodiment, for example, only the annular section 31a may be formed on the working electrode 210, and then the partition section 31b may be formed by vacuum lamination on the wiring section 211 inside the annular section 31a.

Here, the difference between the heat conductivity of the annular section 31a of the first sealing section 31A and the heat conductivity of the partition section 31b is 0.1 W/m·K or more, more preferably 0.10 W/m·K to 0.6 W/m·K, and even more preferably 0.15 W/m·K to 0.4 W/m·K.

The present invention is not intended to be limited to the first to fourth embodiments described above. For example, in the first to fourth embodiments described above, the transparent conductive films 12B to 12D each have two protruding sections 12c; however, the transparent conductive films 12B to 12D do not necessarily need to have two protruding sections 12c, and may have only one protruding section 12c. In this case, the transparent conductive films 12B to 12D each have only one extending section 12d.

Furthermore, in the DSC 50B, DSC 50C and DSC 50D in the first to fourth embodiments described above, the transparent conductive films 12B, 12C and 12D each have two protruding sections 12c and two extending sections 12d. However, from the viewpoint of achieving the first object of increasing the aperture ratio and acquiring excellent durability, the protruding section 12c and the extending section 12d are not necessarily essential in the transparent conductive films 12B, 12C and 12D, and may be omitted.

Furthermore, in the first to fourth embodiments described above, the second sealing section 32A is adhered to the first sealing section 31A, but the second sealing section 32A may not be adhered to the first sealing section 31A.

Furthermore, in the first to fourth embodiments, when the first sealing section 31A and the second sealing section 32A are formed of the same material, in the sealing section 30A, the first sealing sections 31A are extended through a gap S between adjoining counter electrodes 20 to the opposite side of the working electrode 10 in the counter electrode 20, and is adhered to the edge 20a of the counter electrode 20.

In this case, the first sealing section 31A is extended to the surface of the opposite side of the working electrode 10 in the counter electrode 20 and is adhered to the edge 20a of the counter electrode 20. Therefore, even if stress is exerted on the counter electrode 20 in a direction of being separated away from the working electrode 10, detachment of the electrodes is sufficiently suppressed by the first sealing section 31A.

Furthermore, since the first sealing section 31A is extended to the surface of the opposite side of the working electrode 10 in the counter electrode 20 and is adhered to the edge 20a of the counter electrode 20, the distance of penetration of moisture and the like from the atmosphere to the electrolyte 40 further increases. Therefore, the amount of moisture or air that penetrates from the outside of the DSC 50 can be sufficiently reduced in the area between adjoining DSC's 50.

Moreover, in the first to fourth embodiments described above, the sealing section 30A is composed of the first sealing section 31A and the second sealing section 32A, but the second sealing section 32A may be omitted.

Furthermore, in the first embodiment, the thickness of the insulating material 14 is larger than the thickness of the transparent conductive film 12, and the melting point of the insulating material 14 is higher than the melting point of the first sealing section 31. However, the thickness of the insulating material 14 may be less than or equal to the thickness of the transparent conductive film 12, and the melting point of the insulating material 14 may be lower than or equal to the melting point of the first sealing section 31. Furthermore, in the first embodiment, the insulating material 14 is provided, but when a material having a sufficiently high melting point is used for the first sealing section 31A, since short circuit between the counter electrode 20 and the transparent conductive film 12 can be sufficiently prevented, the insulating material can be omitted.

Furthermore, in the first to fourth embodiments described above, the annular first sealing sections 31A of adjoining DSC's 50 are integrated, but from the viewpoint of achieving the second object that connection reliability can be sufficiently enhanced while the aperture ratio is increased, and defective operation can be sufficiently prevented, the annular first sealing sections 31A of adjoining DSC's 50 may not be necessarily integrated together. That is, the annular first sealing sections 31A may be separated apart.

Furthermore, in the first to fourth embodiments described above, the conductive material 60 is constituted of a metal film, but the conductive material 60 is not limited to a metal film and may be constituted of a jumper wire or the like.

Furthermore, in the fourth embodiment described above, the partition section 31b in the first sealing section 31 is formed of a low heat conductive material having lower heat conductivity than the annular section 31a, but it is also acceptable if the partition section 31b of the first sealing section 31 is formed of the same material as that of the annular section 31a, and the area that is provided between the partition section 31b and the transparent substrate 11 in the first wiring protective layer 214 or the second wiring protective layer 215 is formed of a heat conductive material having lower heat conductivity than the area that is provided between the annular section 31a and the transparent substrate 11. Furthermore, it is also acceptable that the partition section 31b in the first sealing section 31 is formed of a low heat conductive material having lower heat conductivity than the annular section 31a, and the area that is provided between the partition section 31b and the transparent substrate 11 in the first wiring protective layer 214 or the second wiring protective layer 215 is formed of a heat conductive material having lower heat conductivity than the area that is provided between the annular section 31a and the transparent substrate 11.

Furthermore, in the second to fourth embodiments described above, a wiring section 211 is provided, but the wiring section 211 is not necessarily needed, and can be omitted.

EXAMPLES

Hereinafter, the content of the present invention will be more specifically described by way of Examples, but the present invention is not intended to be limited to the Examples described below.

Example 1

First, a transparent conductive substrate was prepared by forming a transparent conductive film formed of FTO and having a thickness of 1 µm, on a transparent substrate formed of glass and having a thickness of 1 mm. Patterning was carried out such that four transparent conductive films arranged in a row would be formed, by means of a $CO_2$ laser (V-460 manufactured by Universal Systems, Inc.). Patterning was carried out such that the four transparent conductive films would respectively have a rectangular-shaped main body section having a size of 3 cm×5 cm, and the distance between the main body sections would be 0.5 mm. Furthermore, in three transparent conductive films among the four transparent conductive films, two protruding sections protruding from each of the two lateral edges of the main body section, and an extending section extending from each of the two protruding sections to a position lateral to the lateral edge of the main body section of the transparent conductive film corresponding to an adjoining DSC were formed. At this time, the length of the protruding section in the direction of protrusion was adjusted to 1 cm, and the width of the protruding section was adjusted to 3 mm. Furthermore, the width of the extending section was adjusted to 2 mm, and the length of the extending section in the direction of extension was adjusted to 2 cm.

Next, a paste for forming an oxide semiconductor layer containing titania was applied on the main body section of the transparent conductive film, and the paste was dried and then calcined for one hour at 500° C. Thus, a working electrode having an oxide semiconductor layer 13 was obtained.

Next, a paste containing a low melting point glass was applied by screen printing in the region between the main body sections, and then the paste was calcined. Thus, an insulating material (melting point: 495° C.) formed of a low melting point glass was formed in the region between adjoining main body sections. At this time, the thickness of the insulating material was 60 µM.

Next, the working electrode was immersed for one whole day and night in a dye solution which contained 0.3 mmol of a photosensitized dye formed from N719, and employed a mixed solvent prepared by mixing acetonitrile and tert-butanol at a volume ratio of 1:1 as the solvent. Subsequently, the working electrode was removed and dried, and thus a photosensitized dye was supported on the oxide semiconductor layer.

Next, an electrolyte including iodine redox couples was applied on the oxide semiconductor layer and dried, and thereby, an electrolyte was disposed.

Next, a first sealing section-forming body for forming a first sealing section was prepared. The first sealing section-forming body was obtained by preparing one sheet of a resin film for sealing formed from an ethylene-methacrylic acid copolymer (trade name: NUCREL, manufactured by Mitsui DuPont Polychemical Co., Ltd.) and having a size of 12 cm×5 cm×50 µm, and forming four rectangular-shaped openings in the resin film for sealing. At this time, the first sealing section-forming body was produced such that each of the openings would have a size of 2.8 cm×4.8 cm×50 µm, and the width would be 1 mm.

This first sealing section-forming body was mounted on the working electrode, and then was adhered to the working electrode by heating the first sealing section-forming body to melt.

Next, four sheets of counter electrodes were prepared. Each of the counter electrodes was prepared by forming by a sputtering method a catalyst layer formed from platinum and having a thickness of 10 nm on a titanium foil having a size of 2.95 cm×5 cm×40 µm. Furthermore, another first sealing section-forming body was prepared again, and this first sealing section-forming body was adhered as described above to the surface in the counter electrode which faces the working electrode.

The first sealing section-forming body adhered to the working electrode and the first sealing section-forming body adhered to the counter electrode were arranged to face each other, and the first sealing section-forming bodies were superimposed. In this state, the first sealing section-forming bodies were heated and melted while the first sealing section-forming bodies were pressed. Thus, the first sealing section was formed between the working electrode and the counter electrode.

Next, a second sealing section was prepared. The second sealing section was obtained by preparing one sheet of a resin film for sealing formed of a maleic anhydride-modified polyethylene (trade name: BYNEL, manufactured by DuPont Company) and having a size of 13 cm×6 cm×50 µm, and forming four rectangular-shaped openings in the resin film for sealing. At this time, the second sealing section was produced such that each of the openings would have a size of 2.8 cm×4.8 cm×50 µm, the width of the outer peripheral section would be 1.5 mm, and the width of the partition section that partitioned the opening inside the outer peripheral section would be 1 mm. The second sealing section was bonded to the counter electrode such that the second sealing section sandwiched an edge of the counter electrode together with the first sealing section. At this time, the second sealing section was bonded to the counter electrode and the first sealing section by heating and melting the first sealing section and the second sealing section while pressing the second sealing section against the counter electrode.

Finally, a low temperature-curable type silver paste (manufactured by Fujikura Kasei Co., Ltd., D-500) was prepared, and the silver paste was applied from the counter electrode to the extending section of the corresponding transparent conductive film of an adjoining DSC, and the silver paste was cured for 12 hours at 30° C. In this manner, a metal film formed of silver was formed as a conductive material that connected the counter electrode and the extending section of the corresponding transparent conductive film of an adjoining DSC. The size of the metal film was 7 mm×10 mm×10 µm. Thus, a DSC module was obtained. In the DSC module thus obtained, the distance D in the direction of DSC arrangement between adjoining counter electrodes was 0.5 mm, and the width W of the sealing section (partition section) was 1 mm.

Examples 2 and 3

DSC modules were produced in the same manner as in Example 1, except that the transparent conductive film, the first sealing section, the second sealing section, the insulating material, the distance D in the direction of DSC arrangement between adjoining counter electrodes, and the width W of the sealing section (partition section) were changed as indicated in Table 1.

Examples 4 to 7

DSC modules were produced in the same manner as in Example 1, except that the transparent conductive film, the first sealing section, the second sealing section, the insulating material, the distance D in the direction of DSC arrangement between adjoining counter electrodes, and the width W of the sealing section (partition section) were changed as indicated in Table 1.

Example 8

First, a transparent conductive substrate obtained by forming a transparent conductive film formed of FTO and having a thickness of 1 µm, on a transparent substrate formed of glass and having a thickness of 1 mm was prepared. Patterning was carried out such that four transparent conductive films arranged in a row would be formed, by means of a $CO_2$ laser (V-460 manufactured by Universal Systems, Inc.). Patterning was carried out such that the four transparent conductive films would respectively have a rectangular-shaped main body section having a size of 3 cm×5 cm, and the distance between the main body sections would be 0.5 mm. Furthermore, in three transparent conductive films among the four transparent conductive films, two protruding sections protruding from each of the two lateral edges of the main body section, and an extending section extending from each of the two protruding sections to a position lateral to the lateral edge of the main body section of the corresponding transparent conductive film of an adjoining DSC were formed. At this time, the length of the protruding section in the direction of protrusion was adjusted to 1 cm, and the width of the protruding section was adjusted to 3 mm. Furthermore, the width of the extending section was adjusted to 2 mm, and the length of the extending section in the direction of extension was adjusted to 2 cm.

Next, a paste for forming an oxide semiconductor layer containing titania was applied on the main body section of the transparent conductive film, and the paste was dried and then calcined for one hour at 500° C.

Next, a paste containing silver was applied on the transparent conductive film, dried, and then calcined for one hour at 500° C. Thus, a current collector wire was obtained. Subsequently, a paste containing a low melting point glass was applied by screen printing so as to include the current collector wires formed respectively on adjoining transparent conductive films, and then the paste was calcined for one hour at 500° C. Thus, a first wiring protective layer was formed. Meanwhile, the heat conductivity of the low melting point glass was 0.76 W/m·K.

Subsequently, a paste containing a polyimide was applied by screen printing on the first wiring protective layer, and then the paste was heated for one hour at 350° C. Thus, a second wiring protective layer was formed. Here, the heat conductivity of the polyimide was 0.31 W/m·K. Subsequently, a paste containing polypropylene (hereinafter, referred to as "PP") was applied on the second wiring protective layer and then dried. Thus, a low heat conductive layer having a thickness of 0.06 mm was obtained. Meanwhile, the heat conductivity of PP was 0.125 W/m·K. Thus, a working electrode was obtained.

Next, a photosensitized dye was supported on the oxide semiconductor layer of the working electrode in the same manner as in Example 1.

Next, an electrolyte was disposed on the oxide semiconductor layer in the same manner as in Example 1.

Next, a first sealing section-forming body for forming a first sealing section was prepared in the same manner as in Example 1. Meanwhile, the heat conductivity of NUCREL that constituted the first sealing section-forming body was 0.33 W/m·K.

This first sealing section-forming body was mounted on the working electrode to be superimposed with the low heat conductive layer, and then the first sealing section-forming body was heated and melted to thereby attach the first sealing section-forming body to the working electrode.

Next, one sheet of a counter electrode-forming body was prepared. The counter electrode-forming body was prepared by forming by a sputtering method a catalyst layer formed of platinum and having a thickness of 10 nm on a titanium foil having a size of 2.95 cm×5 cm×40 µm. Furthermore, another first sealing section-forming body as described above was prepared again, and this first sealing section-forming body was adhered in the same manner as in Example 1, to the surface in the counter electrode-forming body which faces the working electrode.

The first sealing section-forming body adhered to the working electrode and the first sealing section-forming body adhered to the counter electrode-forming body were arranged to face each other, and the first sealing section-forming bodies were superimposed. In this state, the first sealing section-forming bodies were heated and melted while the first sealing section-forming bodies were pressed. Thus, the first sealing section was formed between the working electrode and the counter electrode.

Next, one sheet of the counter electrode-forming body was partitioned into four counter electrodes by cutting the counter electrode-forming body by laser processing. The conditions for laser processing at this time were as follows.

(1) Laser light source

Yb: Fiber laser (oscillation wavelength: 1090 nm, product name: MD-F3000, manufactured by Keyence Corp.)

(2) Pulse width of laser light 50 ns (3) Energy irradiated per unit scanning distance 0.06 J/mm Next, a second sealing section was prepared. The second sealing section was obtained by preparing one sheet of a resin film for sealing formed of a maleic anhydride-modified polyethylene (trade name: BYNEL, manufactured by DuPont Company) and having a size of 13 cm×6 cm×50 μm, and forming four rectangular-shaped openings in the resin film for sealing. At this time, the second sealing section was produced such that each of the openings would have a size of 2.8 cm×4.8 cm×50 μm, the width of the outer peripheral section would be 1.5 mm, and the width of the partition section that partitioned the opening inside the outer peripheral section would be 1 mm. The second sealing section was bonded to the counter electrode such that the second sealing section sandwiched an edge of the counter electrode together with the first sealing section. At this time, the second sealing section was bonded to the counter electrode and the first sealing section by heating and melting the first sealing section and the second sealing section while pressing the second sealing section against the counter electrode.

Finally, a low temperature-curable type silver paste (manufactured by Fujikura Kasei Co., Ltd., D-500) was prepared, and the silver paste was applied from the counter electrode to the extending section of the corresponding transparent conductive film of an adjoining DSC, and the silver paste was cured for 12 hours at 30° C. In this manner, a conductive material that was formed of silver and connected the counter electrode and the extending section of the corresponding transparent conductive film of an adjoining DSC, was formed. The size of the conductive material was 7 mm×10 mm×10 μm. Thus, a DSC module was obtained.

Example 9

A DSC module was produced in the same manner as in Example 8, except that a low heat conductive layer was not formed; an annular region that would not be provided between two adjoining DSC's and a partition section that was provided between two adjoining DSC's and divided the annular region were sequentially formed by vacuum lamination; and the first sealing section-forming body was prepared such that the annular region was formed of NUCREL, while the partition section was formed of polypropylene. Meanwhile, in Table 1, in the column for the material, melting point and heat conductivity of the first sealing section, the upper row indicates the material, melting point and heat conductivity of the annular region, and the lower row indicates the material, melting point and heat conductivity of the partition section.

Comparative Examples 1 to 4

DSC modules were produced in the same manner as in Example 1, except that a transparent conductive film that did not have an extending section was formed; the first sealing section, the second sealing section, the distance D in the direction of DSC arrangement between adjoining counter electrodes, and the width W of the sealing section (partition section) were changed as indicated in Table 1; and in the area between adjoining counter electrodes, the counter electrode and the transparent conductive film of an adjoining DSC were connected using a jumper wire.

Comparative Example 5

A DSC module was produced in the same manner as in Example 1, except that a transparent conductive film that did not have an extending section was formed; the first sealing section was produced into four rectangular annular sealing sections each having a width of 1 mm and an opening having a size of 2.8 mm×4.8 mm, without using a second sealing section; the distance between the sealing sections of adjoining DSC's was adjusted to 2 mm; and in the area between the sealing sections, an edge of the counter electrode and the transparent conductive film of an adjoining DSC were connected via a jumper wire.

Comparative Example 6

A DSC module was produced in the same manner as in Comparative Example 5, except that the sealing section and the counter electrode of the second DSC and the fourth DSC, as counted from the first DSC that was on the side of an edge of the four DSC's, were respectively shifted by 2 mm laterally to the direction of arrangement of the four DSC's (in a direction perpendicular to the direction of arrangement of the DSC's), and thereby the transparent conductive films of the second and fourth DSC's were exposed; and the exposed transparent conductive films and the counter electrode of an adjoining DSC were connected via the same conductive material as that used in Example 1. That is, in the DSC module, the shift in position G in a direction perpendicular to the direction of DSC arrangement between adjoining counter electrodes was 2 mm.

Reference Example 1

A DSC module was produced in the same manner as in Example 1, except that the first sealing section was produced into four rectangular-shaped annular sealing sections each having a width of 1 mm and an opening having a size of 2.8 mm×4.8 mm.

For the DSC modules obtained in Examples 1 to 9 and Comparative Examples 1 to 4, the aperture ratios were measured in order to investigate whether the first object described above could be achieved. The results are presented in Table 1. Meanwhile, the acceptance criterion for the aperture ratio was as follows.

Acceptance: 90% or higher

Furthermore, for the DSC modules obtained in Examples 1 to 9 and Comparative Examples 1 to 4, the power generation efficiency immediately after production (initial power generation efficiency) was measured, the power generation efficiency in an environment at 85° C. was measured, and the time taken by the power generation efficiency to decrease by 30% was measured. Here, the power generation efficiency is the energy conversion efficiency with respect to incident light under the conditions of AM1.5 and 100 mW/cm², and is a value obtainable in the case of considering only the area of the porous titanium oxide film as the incident area of light. This time was referred to as endurance time, and was used as an index for the durability of the DSC module. The results are presented in Table 1. Meanwhile, the acceptance criterion for durability was as follows.

Acceptance: 1000 hours or longer

TABLE 1

| | Transparent conductive film | | | First sealing section | | | Second sealing section | | Insulating material | | Low heat conductive layer | | | | | Aperture ratio [%] | Endurance time [hours] |
|---|---|---|---|---|---|---|---|---|---|---|---|---|---|---|---|---|---|
| | Presence or absence of protruding section | Presence or absence of extending section | Thickness [mm] | Material | Melting point [°C.] | Heat conductivity [W/m·K] | Material | Melting point [°C.] | Material | Melting point [°C.] | Thickness [mm] | Material | Heat conductivity [W/m·K] | D [mm] | W [mm] | | |
| Example 1 | Present | Present | 1 | NUCREL | 98 | 0.33 | BYNEL | 127 | Low melting point glass | 495 | 60 | — | — | 0.5 | 1 | 94.9 | 1580 |
| Example 2 | Present | Present | 1 | BYNEL | 127 | 0.33 | BYNEL | 127 | Low melting point glass | 495 | 60 | — | — | 0.5 | 1 | 94.9 | 1480 |
| Example 3 | Present | Present | 1 | NUCREL | 98 | 0.33 | NUCREL | 98 | Low melting point glass | 495 | 60 | — | — | 0.5 | 1 | 94.9 | 1100 |
| Example 4 | Present | Present | 1 | BYNEL | 127 | 0.33 | NUCREL | 98 | Low melting point glass | 495 | 60 | — | — | 0.5 | 1 | 94.9 | 1300 |
| Example 5 | Present | Present | 1 | NUCREL | 98 | 0.33 | — | — | Low melting point glass | 495 | 60 | — | — | 0.5 | 1 | 94.9 | 1000 |
| Example 6 | Present | Present | 1 | NUCREL | 98 | 0.33 | BYNEL | 127 | Low melting point glass | 495 | 1 | — | — | 0.5 | 1 | 94.9 | 1000 |
| Example 7 | None | None | 1 | NUCREL | 98 | 0.33 | BYNEL | 127 | — | — | — | — | — | 0.5 | 1 | 94.9 | 1000 |
| Example 8 | Present | Present | 1 | NUCREL | 98 | 0.33 | BYNEL | 127 | — | — | — | PP | 0.125 | 0.5 | 1 | 94.9 | 1000 |
| Example 9 | Present | Present | 1 | PP | 170 | 0.125 | BYNEL | 127 | — | — | — | — | — | 0.5 | 1 | 94.9 | 1000 |
| Comparative Example 1 | None | None | 1 | BYNEL | 127 | 0.33 | — | — | Low melting point glass | 495 | 60 | — | — | 1 | 2 | 87.4 | 1520 |
| Comparative Example 2 | None | None | 1 | NUCREL | 98 | 0.33 | — | — | Low melting point glass | 495 | 60 | — | — | 1 | 2 | 87.4 | 1100 |

TABLE 1-continued

| | Transparent conductive film | | | First sealing section | | | Second sealing section | | | Insulating material | | | Low heat conductive layer | | | | | |
|---|---|---|---|---|---|---|---|---|---|---|---|---|---|---|---|---|---|---|
| | Presence or absence of protruding section | Presence or absence of extending section | Thickness [mm] | Material | Melting point [° C.] | Heat conductivity [W/m·K] | Material | Melting point [° C.] | | Material | Melting point [° C.] | Thickness [mm] | Material | Heat conductivity [W/m·K] | D [mm] | W [mm] | Aperture ratio [%] | Endurance time [hours] |
| Comparative Example 3 | None | None | 1 | BYNEL | 127 | 0.33 | — | — | | Low melting point glass | 495 | 60 | — | — | 1 | 1 | 92.6 | 650 |
| Comparative Example 4 | None | None | 1 | NUCREL | 98 | 0.33 | — | — | | Low melting point glass | 495 | 60 | — | — | 1 | 1 | 92.6 | 400 |

As shown in Table 1, it was found that the DSC modules obtained in Examples 1 to 9 all passed the acceptance criteria in terms of the aperture ratio and durability. On the contrary, the DSC modules obtained in Comparative Examples 1 and 2 passed the acceptance criterion in terms of durability, but did not pass the acceptance criterion in terms of the aperture ratio. On the other hand, the DSC modules obtained in Comparative Examples 3 and 4 passed the acceptance criterion in terms of the aperture ratio, but did not pass the acceptance criterion in terms of durability.

From the results described above, it was verified that according to the DSC module of the present invention, the aperture ratio can be increased, and the DSC module has excellent durability.

Next, the DSC modules obtained in Example 1, Reference Example 1, Comparative Example 5 and Comparative Example 6, the aperture ratios were measured in order to investigate whether the second object described above could be achieved. The results are presented in Table 2. Meanwhile, in Table 2, "A" in the column for integration of the first sealing sections means that four first sealing sections are integrated, and "B" means that four first sealing sections are not integrated.

TABLE 2

| | Transparent conductive film | | First sealing section | | Second sealing section | D [mm] | G [mm] | Connection means between adjoining DSC's | Aperture ratio [%] |
| | Presence or absence of protruding section | Presence or absence of extending section | Material | Integration | Material | | | | |
|---|---|---|---|---|---|---|---|---|---|
| Example 1 | Present | Present | NUCREL | A | BYNEL | 0.5 | 0 | Metal film | 94.9 |
| Reference Example 1 | Present | Present | NUCREL | B | BYNEL | 0.5 | 0 | Metal film | 87.1 |
| Comparative Example 5 | None | None | NUCREL | B | — | 2 | 0 | Jumper wire | 90.3 |
| Comparative Example 6 | None | None | NUCREL | B | — | 0.5 | 2.0 | Metal film | 91.1 |

As shown in Table 2, the DSC modules obtained in Example 1 and Reference Example 1 passed the acceptance criterion in terms of the aperture ratio. On the contrary, the DSC modules obtained in Comparative Examples 5 and 6 did not pass the acceptance criterion in terms of the aperture ratio.

Furthermore, in the DSC modules of Example 1 and Reference Example 1, for two adjoining DSC's, the counter electrode of one DSC and the extending section of the transparent conductive film of the other DSC are connected with a metal film. It is contemplated that for this reason, there is no risk of the operator's hand being caught therein, and connection reliability can be sufficiently enhanced. Furthermore, since the metal film is sufficiently prevented from being brought into contact with the counter electrodes of adjoining dye-sensitized solar cells, adjoining counter electrodes being electrically connected by the metal film is sufficiently prevented. It is also contemplated that as a result, defective operation of the DSC module can also be sufficiently prevented.

EXPLANATIONS OF REFERENCE NUMERALS 10, 210 WORKING ELECTRODE
11 TRANSPARENT SUBSTRATE
12 TRANSPARENT CONDUCTIVE FILM
13 OXIDE SEMICONDUCTOR LAYER
14 INSULATING MATERIAL
15 TRANSPARENT CONDUCTIVE SUBSTRATE (FIRST ELECTRODE)
20 COUNTER ELECTRODE (SECOND ELECTRODE)
20a EDGE OF COUNTER ELECTRODE
21 METAL SUBSTRATE
30A SEALING SECTION
31A FIRST SEALING SECTION
32A SECOND SEALING SECTION
50, 50A to 50D DYE-SENSITIZED SOLAR CELL
100, 200, 300, 400 DYE-SENSITIZED SOLAR CELL MODULE
211 WIRING SECTION
212 CURRENT COLLECTOR WIRE
213 WIRING PROTECTIVE LAYER
214 FIRST WIRING PROTECTIVE LAYER
215 SECOND WIRING PROTECTIVE LAYER
216 LOW HEAT CONDUCTIVE LAYER

The invention claimed is:

1. A dye-sensitized solar cell module comprising a plurality of dye-sensitized solar cells electrically connected in series,
each of the dye-sensitized solar cells comprising:
a first electrode that comprises a transparent substrate, and a transparent conductive film provided on the transparent substrate;
a second electrode that faces the first electrode;
an oxide semiconductor layer that is provided on the first electrode or the second electrode; and
an annular sealing section that joins the first electrode and the second electrode, wherein
the transparent substrate is composed of a transparent substrate that is common to the plurality of dye-sensitized solar cells,
the second electrodes of two adjoining dye-sensitized solar cells are separated apart from each other,
the sealing section includes an annular first sealing section that is provided between the first electrode and the second electrode
the first sealing sections that are adjoining are integrated together,
the sealing section further comprises an annular second sealing section that is provided so as to overlap with the first sealing section in the direction perpendicular to the surface of the transparent substrate that faces the second electrode, and an edge of the second electrode is sandwiched between the annular second sealing section and the first sealing section,
the second sealing sections of two adjoining dye-sensitized solar cells are integrated together, the second sealing section is adhered to the first sealing section through a gap between the second electrodes of two adjoining dye-sensitized solar cells, the dye-sensitized solar cell further comprises an insulating material that is provided between the first sealing section and the transparent substrate, the thickness of the insulating material is larger than the thickness of the transparent conductive film, and the melting point of the insulating material is higher than the melting point of the first sealing section.

2. The dye-sensitized solar cell module according to claim 1, wherein the second sealing section has a melting point higher than that of the first sealing section.

3. The dye-sensitized solar cell module according to claim 1, wherein the sealing section comprises a resin.

4. The dye-sensitized solar cell module according to claim 1, wherein in two adjoining dye-sensitized solar cells, the transparent conductive film in one of the dye-sensitized solar cell comprises:

a main body section;

a protruding section that protrudes from the main body section over the sealing section laterally to the direction of arrangement of the plurality of dye-sensitized solar cells; and an extending section that is extended from the protruding section to a position lateral to the main body section of the other dye-sensitized solar cell on the outside of the sealing section of the other dye-sensitized solar cell, the second electrode comprises a metal substrate, and the extending section of the transparent conductive film in one of the dye-sensitized solar cell and the metal substrate of the second electrode in the other dye-sensitized solar cell are connected through a conductive material.

5. The dye-sensitized solar cell module according to claim 4, wherein the conductive material is a metal film.

6. The dye-sensitized solar cell module according to claim 1, wherein the area that is provided between two adjoining dye-sensitized solar cells in the first sealing section is formed of a low heat conductive material having lower heat conductivity than the area that is not provided between two adjoining dye-sensitized solar cells.

7. The dye-sensitized solar cell module according to claim 1, wherein the first electrode further comprises a wiring section that is provided between the first sealing section and the transparent substrate, the wiring section comprises a current collector wire that is provided on the transparent conductive film of two adjoining dye-sensitized solar cells; and a wiring protective layer that protects the current collector wire from the electrolyte by covering the current collector wire and is joined to the first sealing section, and in the first sealing section or the wiring protective layer, the area that is provided between two adjoining dye-sensitized solar cells is formed of a low heat conductive material having lower heat conductivity than the area that is not provided between two adjoining dye-sensitized solar cells.

8. The dye-sensitized solar cell module according to claim 6, wherein the low heat conductive material comprises a resin.

* * * * *